US009365743B2

(12) United States Patent
Durot et al.

(10) Patent No.: US 9,365,743 B2
(45) Date of Patent: Jun. 14, 2016

(54) STABLE, READY-TO-USE LIQUID POLYURETHANE RESIN COMPOSITION AND USES THEREOF

(71) Applicant: SOPREMA, Strasbourg (FR)

(72) Inventors: Louis Durot, Paris (FR); Pierre-Etienne Bindschedler, Obernai (FR); Virginie Francois Barseghian, Paris (FR); Remi Perrin, Boersch (FR)

(73) Assignee: Soprema, Strasbourg (FR)

( * ) Notice: Subject to any disclaimer, the term of this patent is extended or adjusted under 35 U.S.C. 154(b) by 0 days.

(21) Appl. No.: 14/352,039

(22) PCT Filed: Oct. 18, 2012

(86) PCT No.: PCT/FR2012/052383
§ 371 (c)(1),
(2) Date: Apr. 15, 2014

(87) PCT Pub. No.: WO2013/057439
PCT Pub. Date: Apr. 25, 2013

(65) Prior Publication Data
US 2014/0275359 A1 Sep. 18, 2014

(30) Foreign Application Priority Data

Oct. 20, 2011 (FR) ...................... 11 59492
Oct. 20, 2011 (FR) ...................... 11 59493
Oct. 20, 2011 (FR) ...................... 11 59496
Oct. 20, 2011 (FR) ...................... 11 59538

(51) Int. Cl.
C09D 175/00 (2006.01)
C09D 175/04 (2006.01)
C08G 18/28 (2006.01)
C08G 18/64 (2006.01)
C08G 18/76 (2006.01)
C08G 18/78 (2006.01)
C08G 18/80 (2006.01)
C09D 175/14 (2006.01)
C09D 195/00 (2006.01)
C08L 95/00 (2006.01)

(52) U.S. Cl.
CPC .............. *C09D 175/04* (2013.01); *C08G 18/28* (2013.01); *C08G 18/289* (2013.01); *C08G 18/64* (2013.01); *C08G 18/76* (2013.01); *C08G 18/78* (2013.01); *C08G 18/80* (2013.01); *C09D 175/00* (2013.01); *C09D 175/14* (2013.01); *C09D 195/00* (2013.01); *C08L 95/00* (2013.01)

(58) Field of Classification Search
CPC ........ C08G 18/28; C08G 18/64; C08G 18/76; C08G 18/78; C08G 18/80; C09D 195/00; C09D 175/14; C09D 175/00
See application file for complete search history.

(56) References Cited

U.S. PATENT DOCUMENTS

| 4,334,052 A | * | 6/1982 | Patton, Jr. ......... C08G 18/8003 528/52 |
| 4,795,760 A | * | 1/1989 | Lucke ............................ 521/83 |
| 4,871,792 A | | 10/1989 | Lucke |
| 5,210,127 A | * | 5/1993 | Werner ............. C08G 18/0871 521/131 |
| 5,219,979 A | | 6/1993 | Greco |
| 5,319,008 A | | 6/1994 | Janoski |
| 5,369,207 A | | 11/1994 | Wolff et al. |
| 6,060,574 A | | 5/2000 | Schmalstieg et al. |
| 2003/0022965 A1 | | 1/2003 | Durot et al. |
| 2003/0134127 A1 | | 7/2003 | Konig et al. |
| 2010/0105829 A1 | | 4/2010 | Schmatloch |
| 2010/0152381 A1 | | 6/2010 | Savino et al. |

FOREIGN PATENT DOCUMENTS

| AU | 20324/88 | | 2/1990 | |
| AU | 2032488 | * | 8/1990 | ............. C08G 18/32 |
| EP | 1 108 735 A1 | | 6/2001 | |
| EP | 1 798 248 A1 | | 6/2007 | |
| EP | 2 383 304 A1 | | 11/2011 | |
| GB | 2 242 435 A | | 10/1991 | |
| JP | 1798248 A1 | * | 6/2007 | ......... C08G 18/0814 |
| NL | WO 02051901 A1 | * | 7/2002 | ......... C08G 18/2825 |
| WO | 02/051901 A1 | | 7/2002 | |
| WO | 2010/106022 A1 | | 9/2010 | |

OTHER PUBLICATIONS

Carter, N.G. "Oxazolidine Diluents: Reacting for the environment", Surface Coatings International (2009), vol. 82(10), pp. 497-502.
The International Search Report for PCT/FR2012/052383 dated May 3, 2013.

* cited by examiner

Primary Examiner — Michael L Leonard
(74) Attorney, Agent, or Firm — McDonnell Boehnen Hulbert & Berghoff

(57) ABSTRACT

A polyurethane resin composition comprising a prepolymer and a polymerizable plasticizer, and which may also comprise at least one constituent chosen from the group comprising:
  a masked polyisocyanate;
  a diluent;
  bitumen or a bituminous mixture;
and mixtures thereof,
and uses thereof.

15 Claims, No Drawings

STABLE, READY-TO-USE LIQUID POLYURETHANE RESIN COMPOSITION AND USES THEREOF

This application is a U.S. national phase of International Application No. PCT/FR2012/052383, filed Oct. 18, 2012, the disclosure of which is hereby incorporated by reference in its entirety.

FIELD OF APPLICATION

The present invention relates to polyurethane resin compositions optionally comprising bitumen, which are liquid, have a reduced or even zero solvent content, are stable, ready-to-use or one-component, which may be applied without heating and are polymerizable in the open air. These compositions are intended for making liquid waterproof coatings, waterproof support coatings, floor coatings and anticorrosion coatings in the field of construction, public works and civil engineering. Bituminous polyurethane resin compositions make it possible to obtain low-cost coatings which have excellent adhesive properties especially on bituminous supports, and which do not require a primer coat.

PRIOR ART

In public works or construction works, it is necessary to protect structures, generally made of concrete, against any infiltration of water. To do this, waterproof coatings are applied on the structures.

These waterproof coatings are often made, especially for horizontal flat surfaces, using bituminous sheets or membranes attached to a support by partial melting of their underface to obtain strong and intimate adhesion. Partial melting is obtained by using blow torches or similar heating devices. However, the use of such devices especially close to flammable elements may present fire ignition risks when the flame is applied or, even worse, fire risks once the work is finished, by reactivation of the combustion of slow-combustion materials that have been in contact with the flame, for instance heat-insulating materials, which are often hidden and covered by other materials that are less heat-sensitive.

Waterproof sheets with an underface that is self-adhesive without heating are, obviously, also known, but they are laborious to install and/or are not sufficiently adherent to provide intimate surface contact and long-lasting fixing, especially on rough or vertical surfaces. Furthermore, their use on surfaces comprising singular points proves to be complicated, if not impossible. Thus, waterproof sheets with an underface that is self-adhesive without heating must be replaced with liquid coatings in the following cases:
  when the surface contains singular points,
  on a porous surface or on non-closed or irregular surfaces,
  on a vertical surface due to a creep phenomenon,
  when it is too cold, because the self-adhesive power of the sheets is reduced,
  when the regulation does not allow the use of sheets.

Liquid compositions have been envisaged for facilitating the application of these waterproof coatings. In particular, acrylic dispersions in aqueous solution exist, which harden on loss of water. However, these products have the drawback of hardening at the surface after application, forming a very thin coat which makes the evaporation of water difficult, thus giving rise to the formation of blisters. These products harden slowly, especially in cold weather, they are very sensitive to rain before they have totally hardened, and they form blisters in summer. What is more, these products show poor resistance to prolonged immersion in water, and are therefore unsuitable for waterproofing horizontal flat surfaces. Finally, their mechanical strength is insufficient for use on traffic-bearing surfaces.

Waterproof products of polyurethane resin type also exist, such as multi-component compositions, especially two-component compositions, or solvent-containing one-component compositions, or solvent-free one-component compositions of "hot-melt" type, i.e. which are not liquid at room temperature, however solvent-free liquid one-component compositions which can produce self-protected coatings for external use are not yet known on the market.

The advantage of having a more or less viscous liquid composition, with or without addition of bitumen, is that it can be applied by spatula, roller or brush, especially in places where it is difficult to install sheets.

Conventionally, a ready-to-use polyurethane resin which can be applied without heating comprises:
  a prepolymer which is the reaction product of a polyisocyanate with a polyol,
  a solvent or a combination of a solvent and a plasticizer, which is generally exogenous,
  a catalyst and/or a hardener enabling polymerization,
  optionally a compatibilizer when the composition contains bitumen.

The compatibilizer is necessarily present when the resin is a bituminous polyurethane resin using a standard polyurethane prepolymer.

The prior art polyurethane resin compositions comprise large amounts of exogenous and inert plasticizers and/or solvent so as to lower their viscosity. The use of solvent generates compositions having the following drawbacks:
  an unpleasant odor due to the volatile organic compounds,
  a toxicity that results in specific labeling,
  problems with regard to environmental regulations.

The use of inert exogenous plasticizers generates compositions having the following drawbacks:
  weakening of the mechanical strength,
  weakening of the adhesion,
  reduced aging over time,
  increased water absorption.

Specifically, the exogenous plasticizer separates the polymer chains, which leads to a final coating that has weakened mechanical and aging properties. Furthermore, the separation of the polymer chains will give a coating that is capable of absorbing water, which will be reflected by swelling of the coating and, in the long term, a lack of adhesion thereof. Now, if it is desired to obtain a waterproof coating, said coating must not have any adhesion defects or substantial water absorption. What is more, the use of an inert exogenous plasticizer does not make it possible to obtain enough adhesiveness to ensure a sufficiently intimate, strong and long-lasting attachment on different supports such as bitumen or cement, especially on rough or vertical supports, and even on horizontal supports with stagnant water without primer. It is thus often necessary, in order to use these more or less viscous liquid products, to envisage an adhesion primer and/or an additional specific protective layer.

Bayer has disclosed, in patent EP 1 108 735, a solvent-free two-component non-bituminous polyurethane resin composition. The liquid state of the composition is obtained by using a plasticizer which does not comprise any isocyanate functions NCO or any hydroxyl functions (—OH), i.e. it is not polymerizable. However, due to the massive use of this exogenous plasticizer, the final coating has reduced mechanical properties, increased UV sensitivity and sensitivity to fungal parasites, such as molds and fungi.

An important application of polyurethane coatings is exterior use. When a colored coating is desired on a traffic-bearing zone, a bitumen-free polyurethane resin composition, or non-bituminous polyurethane resin, which has high mechanical strength is used.

On the other hand, when it is desired to make a coating on a non-traffic-bearing zone, especially on a roof, a polyurethane resin composition with bitumen, or bituminous polyurethane resin, which shows high adhesion on a bituminous support or on a concrete support free of primer may be used. The introduction of bituminous mixtures makes it possible to lower the price of the composition and to improve the adhesion to a bituminous support, but it is a source of additional difficulties associated with the compatibilization of bitumen with the most commonly used polar polyurethane resins or polar polyurethane prepolymers.

At the present time, the only compositions found on the market are solvent-free two-component bituminous polyurethane resin compositions or alternatively solvent-bearing one-component bituminous polyurethane resin compositions which incorporate large amounts of aromatic oils or of exogenous plasticizers, such as diisopropylnaphthalene, dioctyl phthalate (DOP), diisononyl phthalate (DINP), Mesamoll®, trimethyl pentanediol diisobutyrate (TXIB) and butylbenzyl phthalate, and/or liquid filler or liquid diluent. However, the coatings obtained with such products cannot be applied to a bituminous support. Indeed, the aromatic oil exudes, dilutes the support, and a liquid layer forms between the bitumen of the support and the bitumen of the waterproof coating. Thus, such a coating is unsuitable for repairing an existing bituminous coating. Furthermore, the prior art one-component bituminous polyurethane resin compositions cannot be used externally. Indeed, after application, the plasticizing oil evaporates, giving rise, in a relatively short period of time, to microfissures in the coating, which weaken the waterproof properties. Such bituminous polyurethane resins using a plasticizing aromatic oil as compatibilizer are the usual and customary products on the market, which cannot be used without protection or on bituminous supports, and which are used only on concrete or cement supports with protection.

In addition to the previously mentioned problems, the products described under the name "Tremco system" in U.S. Pat. No. 5,319,008 have viscosities between 40,000 and 75,000 centipoises. They are therefore products that must be heated before application, commonly known as "hot-melt" products, since they are not liquid at room temperature or not sufficiently liquid at room temperature to be able to be applied easily. These products are therefore not commercially viable.

The majority of the known bituminous polyurethane resin compositions are not in the form of a one-component or ready-to-use composition, which would greatly facilitate their use, in particular on a building site. Specifically, the majority of the prior art self-protected bituminous polyurethane resin compositions are two-component systems, which must be mixed with a hardener or another reactive agent before application to a surface in order for the polymerization to take place.

In patent application FR 2 787 801, Applicant has disclosed a stable, ready-to-use liquid bituminous polyurethane resin composition. This composition is suitable for waterproofing self-protected exterior surfaces. However, in order to be industrially usable, this composition must contain a solvent so as to lower the viscosity of the composition and to facilitate its application on works to be rendered waterproof. Solvents, however, are undesirable and expensive and, due to ecological and public health reasons, their use is gradually being reduced and will in all likelihood be banned within a few years.

Teroson has disclosed, in U.S. Pat. No. 4,871,792, a solvent-free ready-to-use bituminous polyurethane resin composition. The compatibilization between the bitumen and the prepolymer is achieved by using two plasticizers: a butylurethane-formaldehyde-carbamate resin and 2,3-dibenzyltoluene. The drawback of this composition is that it generates toxic formaldehyde, which implies specific toxicity labeling that dissuades the consumer. Furthermore, the composition has a pasty rather than liquid consistency, which renders it fit for use as a mastic and not as a liquid waterproof coating that can be applied without heating. Since mastic is very thick, it does not need to have good resistance to aging since only a small area is exposed. Such a composition, applied as a coating in a thickness of 1 to 3 mm, would not have sufficient resistance in an external medium and could not be applied without heating.

Tremco discloses, in patent application GB 2 242 435, a solvent-free bituminous polyurethane resin composition. The semiliquid state of the composition is due to the use of a surfactant type molecule having a semipolar head and an aliphatic chain. This surfactant used at a dose of 1% to 1.5% relative to the weight of the composition is a good compatibilizer which disperses the bitumen in the prepolymer, but it is in too low a proportion to lower the viscosity of the composition. However, this surfactant is not a plasticizer; a plasticizer must thus necessarily also be added to the composition. Since the described composition does not contain any solvent, the exogenous plasticizer, being non-polymerizable, cannot remain in the final coating, and substantial exudation is observed after application. Furthermore, the composition of patent GB 2 242 435 does not offer a solution for removing the bubbling problem inherent in polyurethane resins. Indeed, during polymerization in the open air, the isocyanate functions react with the air moisture to form urethane bonds, releasing carbon dioxide. The gas released gives rise to the formation of foam which generates surface defects on the final coating.

The present inventors have found that it is possible to overcome all the drawbacks of the prior art compositions and products while at the same time limiting, or even eliminating, the use of solvent, by using:

a polymerizable plasticizer that does not remain in the composition in its free form after its application as described in patent application PCT/FR2012/052369 filed on 18 Oct. 2012;

optionally a masked polyisocyanate as described in patent application PCT/FR2012/052372 filed on 18 Oct. 2012;

optionally a reactive diluent comprising a bis-oxazolidine and optionally a mono-oxazolidine, a catalyst and a polyisocyanate having a number of isocyanate functions strictly greater than 1 and less than or equal to 3.1, preferably greater than 1.5 and less than or equal to 2.2, as described in patent application PCT/FR2012/052376 filed on 18 Oct. 2011;

and mixtures thereof.

Thus, the present invention relates to liquid polyurethane resin compositions, which do not have any foaming and bubbling problems during their application, and to the use thereof for making coatings, especially self-protected waterproof coatings. Preferably, the compositions according to the invention are stable, non-toxic one-component or ready-to-use compositions.

The coatings obtained have good mechanical strength and are resistant to UV, to oxidation aging, to water and to chemical attack and do not have any surface defects (bubbles or exudation). Such coatings may be traffic-bearing and are particularly suitable for use as waterproof coatings in an unprotected external medium.

DEFINITIONS

According to the present invention, the term "liquid composition" means a composition having a viscosity between 1,000 and 40,000 centipoises, said viscosity being measured at 23° C. using a Brookfield viscometer (for viscosities of less than 10,000 centipoises, the measurements are taken with the R5 module at a speed of 30 rpm and for viscosities of greater than 10,000 centipoises, the measurements are taken with the R6 module at a speed of 20 rpm). Such a viscosity allows the application of the composition especially with a roller commonly known as a fabric roller or a brush to form 0.5 to 2 mm thick layers in one or more applications.

The term "one-component composition or ready-to-use composition" means a composition which is intended to be applied on its own by the final user, i.e. by the worker who will perform the waterproof coating. Such a ready-to-use composition is conventionally known in the art as a "one-component" composition, as opposed to compositions which require the addition of a catalyst or hardener or other reactive agent before use or which must be applied in a limited time span (a few hours) before being mixed.

The term "stable composition" means a composition which can be stored for a minimum of 4 months without any phase separation or mass gelling being observed.

The term "non-toxic composition" means a polyurethane resin composition or bituminous polyurethane resin composition which contains less than 1% by weight of free diisocyanate monomers, according to directive 67/548/EEC (30th ATP directive 2008/58/EC), the free diisocyanate monomer content being measured by gas chromatography coupled to a mass spectrometer (according to standard EN ISO 17734-1/2006).

The term "traffic-bearing coating" means a coating whose mechanical strength is sufficient to allow the circulation of people and vehicles on its free surface.

The term "coating with good mechanical strength" means a coating which has a tensile strength of greater than or equal to 2 MPa for a non-traffic-bearing coating and a tensile strength of greater than or equal to 5 MPa for a traffic-bearing coating (the tensile strength is measured on an Instron machine according to standard EN ISO 527-3). Conventionally, in practice, for an elongation of greater than or equal to 100%, a non-traffic-bearing coating has a tensile strength of 2 to 3 MPa and a traffic-bearing coating has a tensile strength of 5 to 8 MPa. Higher values for a traffic-bearing coating are obviously acceptable.

The term "self-protected coating, which is resistant to UV rays, to weathering and to chemical attack" means a coating which has a level of degradation of the mechanical properties of less than 50% after aging for 2500 hours in an accelerated aging chamber in cycles alternating 6 hours of exposure to UVA and 6 hours of water condensation at 60° C.

The term "prepolymer" means the reaction product of a polyol or a polyol mixture containing a number of OH functions between 1.5 and 3 with a polyisocyanate or a mixture of polyisocyanates containing a number of NCO functions between 1.6 and 3, in a ratio such that the number of NCO functions of the polyisocyanate or of the polyisocyanate mixture relative to the number of OH functions of the polyol or of the polyol mixture is from 1.5 to 2.5 approximately. Conventionally, the polyols used are especially polyether type such as a polyethylene glycol (PEG), a polypropylene glycol (PPG), a polypropylene glycol glycerol triol, or a polytetrahydrofuran (PTHF) or polyester type polyol, such as Priplast® 3196 sold by Croda or Krasol® LBH-p 3000 sold by Cray Valley or a polycaprolactone such as PCP 1000 sold by Solvay.

The term "polyisocyanate" means a compound containing more than one isocyanate function, diisocyanate may therefore also be termed in the present application a polyisocyanate.

The term "TDI" means toluene diisocyanate.
The term "MDI" means diphenylmethane diisocyanate.
The term "HDI" means hexamethylene diisocyanate.
The term "IPDI" means isophorone diisocyanate.

The term "—OH number of the molecule [A]" means the number of OH groups present on the molecule [A].

The term "hydroxyl number of [A]" means the total number of reactive hydroxyl groups on [A], as can be measured by back-titration with potassium hydroxide. The hydroxyl number is expressed in mg KOH/g, which corresponds to the amount of KOH in mg which is required to neutralize 1 g of [A].

The term "solvent" means any solvent that is conventionally used in polyurethane resin compositions, said solvent being inert toward the reagents contained in the composition, liquid at room temperature and having a boiling point below 240° C.

The term "exogenous plasticizer" means a molecule or oligomer added to the polymer resin compositions, such as a polyurethane resin composition, to make the resulting material more flexible, stronger, more resilient and/or easier to manipulate, said exogenous plasticizer being inert, i.e. it does not comprise any reactive functions that would enable it to react with itself or with the prepolymers contained in the composition.

The term "mono-oxazolidine" means a 5-membered cyclic product which comprises only one nitrogen and at least one oxygen and which is opened in the presence of atmospheric moisture to lead to only one reactive nitrogen function.

The term "alkyl" means a hydrocarbon radical containing 1 to 10 carbon atoms, corresponding to general formula $C_nH_{2n+1}$ wherein n is greater than or equal to 1. The alkyl groups may be linear or branched and may be substituted with the groups indicated in the present patent application.

The term "aryl" means a polyunsaturated aromatic hydrocarbon group containing only one ring (i.e. phenyl) or several fused rings (for example naphthyl) or several rings linked via a covalent bond (for example biphenyl), which typically contain 5 to 12 and preferentially 6 to 10 carbon atoms, and wherein at least one ring is aromatic. The aromatic ring may optionally comprise one to two additional fused rings (i.e. cycloalkyl, heterocycloalkyl or heteroaryl). The term "aryl" also comprises partially hydrogenated derivatives of the carbocyclic system is described above.

When the suffixes "ene" or "diyl" are used in conjunction with an alkyl group, this means that the alkyl group defined above contains two single bonds as points of attachment to other groups.

The term "arylalkyl" or "heteroarylalkyl" means a linear or branched alkyl substituent containing a carbon atom attached to an aryl or heteroaryl ring.

The term "heteroaryl" means one ring or two rings that are fused or linked via a covalent bond, comprising 5 to 12 carbon atoms and preferentially 6 to 10 carbon atoms, wherein at least one of the rings is aromatic and wherein at least one or more carbon atoms are replaced with oxygen, nitrogen and/or sulfur. The term "heteroaryl" also comprises systems described above containing a fused aryl, cycloalkyl, heteroaryl or heterocycloalkyl group.

The term "cycloalkyl" means a saturated or unsaturated, cyclic monovalent hydrocarbon, containing one or two rings and comprising 3 to 10 carbon atoms.

The term "heterocycloalkyl" means a cycloalkyl wherein at least one carbon atom is replaced with an oxygen, nitrogen and/or sulfur atom.

The term "arylcycloalkyl" or "heteroarylcycloalkyl" means a cycloalkyl that is fused or linked via a covalent bond to an aryl or heteroaryl ring.

The term "arylheterocycloalkyl" or "heteroarylheterocycloalkyl" means a heterocycloalkyl that is fused or linked via a covalent bond to an aryl or heteroaryl ring.

The term "monounsaturated or polyunsaturated hydrocarbyl" means a hydrocarbon chain containing 2 to 30 carbon atoms which may comprise at least one unsaturation.

The following groups: alkyl, aryl, arylalkyl, arylcycloalkyl, arylheterocycloalkyl, heteroaryl, heteroarylalkyl, hydrocarbon with at least one unsaturation, monounsaturated or polyunsaturated hydrocarbon chain, may also comprise one or more standard substituents chosen from: halogen, alkyl, cycloalkyl, heterocycloalkyl, aryl, heteroaryl, alkoxy, haloalkyl, arylalkyl, heteroarylalkyl, arylheterocycloalkyl.

Polyurethane Resin Composition

A first object of the invention is a polyurethane resin composition comprising a prepolymer and a polymerizable plasticizer containing a hydrocarbon chain, only one end of which bears more than one isocyanate function, said hydrocarbon chain comprising and/or being substituted with an aromatic ring and/or an aliphatic ring and/or said hydrocarbon chain being substituted with at least two hydrocarbon chains that may comprise an unsaturation, and the number of isocyanate functions being strictly greater than 1, preferably greater than 1.2, more preferentially greater than 1.5 and less than or equal to 2.2. The prepolymers introduced in the composition according to the invention are commercial products, but they may also be synthesized before preparing the polyurethane resin composition. Conventionally, the prepolymers are formed by reaction between:
  a polyol containing between 1.5 and 3 OH functions and having a molecular weight between 900 and 3,000 g/mol, preferably between 1,000 and 2,800 g/mol and more preferentially between 1,500 and 2,500 g/mol; and
  a diisocyanate and/or polyisocyanate containing between 1.6 and 3 NCO functions;
in a ratio such that the number of NCO functions of the polyisocyanate relative to the number of OH functions of the polyol is from 1.5 to 2.5 approximately.

The polyol used to form the prepolymer may be a polyether, polyester, polybutadiene or polycarbonate type polyol, and mixtures thereof.

The polyether type polyol may be a polypropylene glycol, a polyethylene glycol, a polypropylene glycol glycerol triol, a polyethylene glycol glycerol triol, or a polytetrahydrofuran.

The polyester type polyol may be a polycaprolactone, a polyester of fatty acid dimers comprising 34 to 36 carbon atoms, a polyadipate polyester or a polyphthalate polyester.

The polycarbonate polyol may be a 1,6-hexanediol polycarbonate.

Preferably, the polyol containing between 1.5 and 3 OH functions and having a molecular weight between 900 and 3,000 g/mol used to form the prepolymer is a polytetrahydrofuran, a 1,6-hexanediol polycarbonate, a polyester of fatty acid dimers comprising 34 to 36 carbon atoms, a polycaprolactone or a hydroxylated polybutadiene.

The diisocyanate and/or polyisocyanate used to form the prepolymer may be MDI, a polymeric MDI, TDI, a TDI trimer, HDI, a HDI trimer, IPDI, an IPDI trimer, and mixtures thereof.

Preferably, the diisocyanate and/or polyisocyanate used to form the prepolymer is MDI, a polymeric MDI, TDI, a TDI trimer, and mixtures thereof.

The composition according to the invention may also comprise at least one constituent chosen from the group comprising:
  a masked polyisocyanate, which has the following formula:

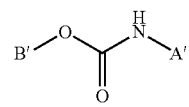

wherein
  B' represents alkyl,
  A' represents a group comprising a number of isocyanate functions between 1.5 and 2.2, preferably between 1.5 and 2.1 and even more preferentially between 1.5 and 2;
a diluent comprising:
  a polyisocyanate or a mixture of polyisocyanates having a number of isocyanate functions strictly greater than 1 and less than or equal to 3.1, preferably greater than 1.5 and less than or equal to 2.2,
  a bis-oxazolidine and optionally a mono-oxazolidine, and
  a catalyst,
the amounts of bis-oxazolidine, and optionally of mono-oxazolidine, and of polyisocyanate or of the mixture of polyisocyanate containing a number of isocyanate functions strictly greater than 1 and less than or equal to 3.1 being such that the molar ratio between the —NH functions of the bis-oxazolidine, and optionally of the mono-oxazolidine, and the NCO functions is from 0.3 to 0.75; the —NH functions of the bis-oxazolidine, and optionally of the mono-oxazolidine, being the —NH functions derived from the amine functions formed after opening of the oxazolidine ring;
and mixtures thereof.

The number of isocyanate functions is estimated by calculation after NCO titration by back-titrating the excess of dibutylamine with hydrochloric acid (according to standard EN ISO 14896-2006).

According to a particular embodiment, the polyurethane resin composition according to the invention comprises bitumen of natural or synthetic origin or a liquid bituminous mixture optionally comprising a plasticizing oil also known as a "cut-back".

According to a preferred embodiment, the polyurethane resin composition according to the invention comprises a prepolymer, the polymerizable plasticizer, the masked polyisocyanate, the diluent and optionally bitumen or a liquid bituminous mixture.

According to another preferred embodiment, the composition according to the invention does not comprise any masked polyisocyanate, but at least part of the prepolymer of the composition is a masked prepolymer which is the reaction product of said masked polyisocyanate with a polyol containing between 1.5 and 3 OH functions and having a molecular weight between 900 and 3,000 g/mol, preferably between 1,000 and 2,800 g/mol and more preferentially between 1,500 and 2,500 g/mol, in a ratio such that the number of NCO functions of the polyisocyanate relative to the number of OH functions of the polyol is from 1.5 to 2.5 approximately.

According to another preferred embodiment, the composition according to the invention comprises both the masked polyisocyanate and the masked prepolymer as defined above.

According to an advantageous embodiment, the compositions according to the invention are liquid and have a solvent content of less than 10%, preferably less than 5% and even more preferentially less than 2%. According to an even more preferred embodiment, the compositions according to the invention are liquid even though they contain no solvent. Said compositions are said to be liquid because their viscosity is between 1,000 and 40,000 centipoises, said viscosities being measured at 25° C. using a Brookfield DV-E viscometer, spindle 6, speed 20 rpm.

When the polyurethane resin compositions do not comprise any bitumen, their viscosity is preferentially between 1,000 and 20,000 centipoises.

When the polyurethane resin compositions comprise bitumen, their viscosity is preferentially between 15,000 and 40,000 centipoises.

According to another advantageous embodiment, the compositions according to the invention have an exogenous plasticizer content of less than 10%, preferably less than 5% and even more preferentially less than 2%. According to an even more preferred embodiment, the compositions according to the invention are totally free of exogenous plasticizer.

According to another advantageous embodiment, the compositions according to the invention are one-component or ready-to-use, i.e. they may be applied directly on the surface to be waterproofed, without mixing with another constituent, and they polymerize on their own in the open air.

According to another advantageous embodiment, the compositions according to the invention are stable and may be stored for a minimum of 4 months without any phase separation or mass gelling being observed. This stability arises from the good compatibilization of the various constituents of the compositions thanks to the polymerizable plasticizer, the diluent and/or the masked polyisocyanate.

According to another advantageous embodiment, the compositions according to the invention have low toxicity since they comprise less than 5%, preferably less than 4%, more preferentially less than 3%, even more preferentially less than 2% and even more preferentially less than 1% by weight of free diisocyanate monomers. When the compositions according to the invention contain less than 1% by weight of free diisocyanate monomers, as stipulated by the MDI classification and labeling according to directive 67/548/EEC, rule CR No. 790/2009 amending the harmonized classifications of appendix VI, part 3, of rule No. 1272/2008, these compositions may be marketed without any "toxic" or "category 3 carcinogen" or "R40: suspected carcinogenic effect—insufficient proof" labeling.

Preferably, the polyurethane resin composition according to the invention is not a polyurethane foam composition. As a result, according to a particular embodiment, the composition according to the invention will not be mixed with water to polymerize and give a polyurethane foam. Similarly, the composition according to the invention is not intended to be mixed with a blowing agent such as a gas, for example propane, butane, isobutane, carbon dioxide, carbon monoxide or dimethyl ether to form a polyurethane foam.

Polymerizable Plasticizer

The polymerizable plasticizer introduced in the composition according to the invention makes it possible to lower the viscosity thereof so as to obtain liquid compositions that can be easily applied by the users with a spatula, roller or brush. Thus, the polymerizable plasticizer makes it possible to reduce, or even eliminate, the use of solvents in polyurethane resin compositions, preferably one-component polyurethane resin compositions, which limits, or even eliminates, the drawbacks associated with the presence of solvents. Besides the advantages linked to a low solvent content, Applicant has observed that the coatings obtained with solvent-free non-bituminous polyurethane resin compositions which comprise the polymerizable plasticizer adhere better to certain supports than the coatings obtained with compositions with solvent but without any polymerizable plasticizer. This enhanced adhesion makes it possible to apply the compositions directly onto concrete, without the need to apply an adhesion primer layer beforehand.

What is more, the polymerizable plasticizer makes it possible to improve the compatibility between the bituminous fillers and the prepolymers in bituminous polyurethane resin compositions, which are preferably one-component, which makes it possible to reduce, or even eliminate, the use of standard compatibilizers such as exogenous plasticizers in bituminous polyurethane resin compositions.

Replacing the exogenous plasticizers with the polymerizable plasticizer in bituminous polyurethane resin compositions eliminates the exudation of said exogenous plasticizers, which makes it possible to apply the bituminous compositions directly onto bitumen, which is not possible when the composition comprises a high exogenous plasticizer content.

The polymerizable plasticizer introduced in the composition according to the invention contains a hydrocarbon chain, only one end of which bears more than one isocyanate function, said hydrocarbon chain comprising and/or being substituted with an aromatic ring and/or an aliphatic ring and/or said hydrocarbon chain being substituted with at least two hydrocarbon chains that may comprise an unsaturation, and the number of isocyanate functions being strictly greater than 1, preferably greater than 1.2, more preferentially greater than 1.5 and less than or equal to 2.2.

The hydrocarbon chain of the polymerizable plasticizer, of which only one end bears more than one isocyanate function, must not be a purely aliphatic unsubstituted chain, in order for the polymerizable plasticizer according to the invention to have sufficient diluent power to replace some or all of the solvent of a liquid polyurethane resin composition.

Preferably, the two hydrocarbon chains that may comprise an unsaturation, which may substitute the hydrocarbon chain, of which only one end bears more than one isocyanate function, do not comprise any oxygen atoms, and preferably do not comprise any atoms other than carbon and hydrogen.

The polymerizable plasticizer introduced in the composition according to the invention is described in patent application PCT/FR 2012/052369 filed on 18 Oct. 2012, which is incorporated by reference.

The polymerizable plasticizer used in the composition according to the invention has a molecular weight between 600 and 3,000 g/mol, preferably between 700 and 2,500 g/mol and even more preferentially between 800 and 2,000 g/mol.

The polymerizable plasticizer used in the composition according to the invention should have a viscosity that is as low as possible, it being understood that it must be introduced into liquid compositions with a limited solvent content, or even into solvent-free compositions. An acceptable viscosity is between 400 and 14,000 centipoises, preferably between 1,300 and 13,000 centipoises and even more preferentially between 2,000 and 12,000 centipoises, measured with a Brookfield viscometer (spindle 6, speed 20 rpm, 25° C.). In the case of a plasticizer prepared based on aliphatic polyisocyanate, the viscosity will be of the order of 5,000 to 14,000 centipoises, whereas in the case of a plasticizer prepared based on aromatic polyisocyanate, the viscosity will be lower, of the order of 400 to 4,000 centipoises. The diluent power and the low viscosity of the polymerizable plasticizer are due to the presence of a hydrocarbon chain that is not a purely aliphatic unsubstituted chain and to the number of isocyanate functions of less than or equal to 2.2 present at only one end. Indeed, if the polymerizable plasticizer comprised isocyanate functions at more than one end, the viscosity would be too high for it to be able to be used as a diluent in replacement for all or part of the solvent contained in a liquid polyurethane resin composition. In addition, this product is a good compatibilizer for prepolymers with bituminous mixtures using natural or synthetic bitumens by virtue of its hydrocarbon chain bearing or substituted with an aromatic ring and/or an aliphatic ring and/or by virtue of its hydrocarbon chain substituted with at least two hydrocarbon chains that may comprise an unsaturation.

The polymerizable plasticizer used in the composition according to the invention polymerizes with the prepolymers contained in said composition. In contrast with a standard plasticizer which can exude on aging after application, the polymerizable plasticizer according to the invention will not exude since it is no longer in its free form in the final coating. The defects associated with this exudation, such as the reduction of the adhesion to the support and of the mechanical performance qualities, water absorption, poor resistance to aging, increased sensitivity to UV and to fungal parasites, and the appearance of bubbles and blisters on the coating, will thus be avoided by the use of the polymerizable plasticizer according to the invention.

According to a particular embodiment, the polymerizable plasticizer used in the composition according to the invention has general formula (I) below:

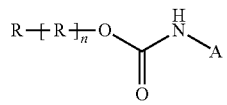
(I)

wherein each R independently represents a unit which does not comprise any hydroxyl functions or any isocyanate functions and which is chosen from the group comprising:
  alkyl,
  cycloalkyl,
  aryl,
  heteroaryl,
  arylcycloalkyl,
  arylheterocycloalkyl,
  heteroarylalkyl,
  heteroarylcycloalkyl,
  monounsaturated or polyunsaturated hydrocarbyl;
and wherein n is between 2 and 50, preferably between 3 and 30 and even more preferentially between 5 and 25;
and wherein A is a group comprising a number of isocyanate functions strictly greater than 1, preferably greater than 1.2, more preferentially greater than 1.5 and less than or equal to 2.2;
on condition that formula (I) comprises either at least one aromatic or aliphatic ring in at least one unit R or at least two alkyl units R substituted with an alkyl chain.

Preferably, the "group" of A is:
a polymer chain (originating from a polymeric MDI) corresponding to formula (A1):

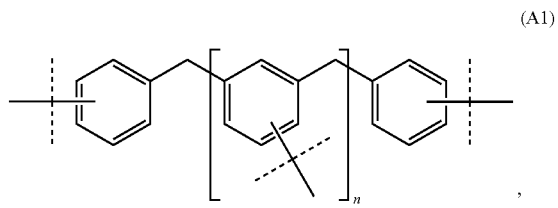
(A1)

a radical corresponding to formula (A2) or to a related radical of a TDI trimer:

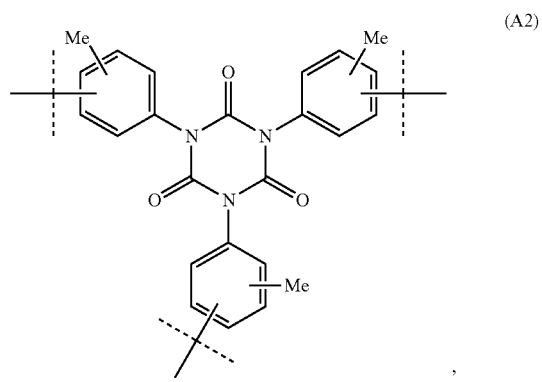
(A2)

a radical corresponding to one of the formulae (A3) and/or (A4) or to a related radical of a HDI trimer:

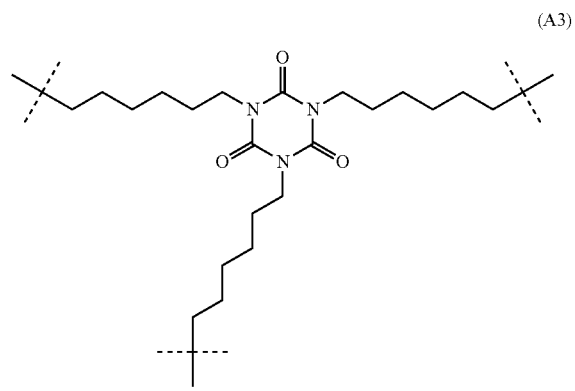
(A3)

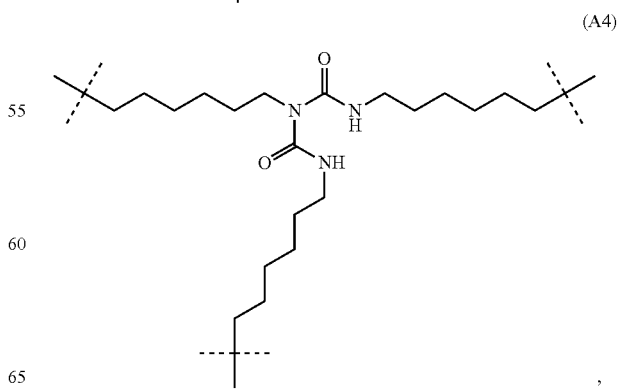
(A4)

a radical corresponding to formula (A5) or to a related radical of an IPDI trimer:

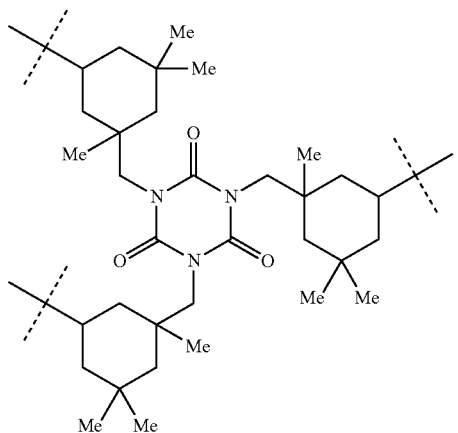

(A5)

wherein each dashed line represents a point of attachment to a NCO function or to the group —NHCOO—(R)$_n$—R of formula (I) of the polymerizable plasticizer and on condition that there is at least one dashed line that is a point of attachment to said group —NHCOO—(R)$_n$—R and that the remaining lines represent a point of attachment to a NCO function.

According to a preferential embodiment, the polymerizable plasticizer used in the composition according to the invention has general formula (II) below:

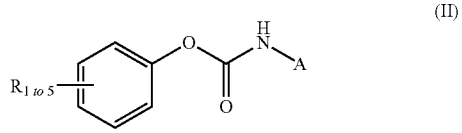

(II)

wherein the substituents R$_{1\ to\ 5}$ are each independently:
  halogen,
  alkyl,
  haloalkyl,
  cycloalkyl,
  aryl,
  alkoxy,
  arylalkyl,
  heteroaryl,
  monounsaturated or polyunsaturated hydrocarbon chain;
and wherein R$_{1\ to\ 5}$ do not contain any hydroxyl functions or any isocyanate functions;
and wherein at least one from among R$_{1\ to\ 5}$ represents a hydrocarbon polymer chain comprising and/or being substituted with at least one repeating unit:
  alkyl,
  aryl,
  arylalkyl,
  arylcycloalkyl,
  arylheterocycloalkyl,
  heteroaryl,
  heteroarylalkyl,
  heteroarylcycloalkyl,
  heteroarylheterocycloalkyl,
  hydrocarbyl with at least one unsaturation;

and wherein A is a group comprising a number of isocyanate functions strictly greater than 1, preferably greater than 1.2, more preferentially greater than 1.5 and less than or equal to 2.2.

According to a particular embodiment, the polymerizable plasticizer used in the composition according to the invention has general formula (II), wherein the hydrocarbon polymer chain corresponds to general formula (IIIa) wherein Z is a carbon and/or oxygen atom and n is between 2 and 50, preferably between 3 and 30 and even more preferentially between 5 and 25.

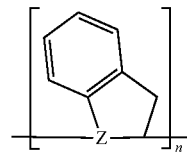

(IIIa)

According to a particular embodiment, the polymerizable plasticizer has general formula (II), wherein the hydrocarbon polymer chain corresponds to general formula (IIIa) wherein Z is a carbon or oxygen atom, wherein n is between 2 and 50, preferably between 3 and 30 and even more preferentially between 5 and 25, and wherein A is a radical corresponding to formula (A2) or to a related radical of a TDI trimer which comprises a number of isocyanate functions strictly greater than 1 and less than or equal to 2.2.

According to another embodiment, the polymerizable plasticizer has general formula (II), wherein the hydrocarbon polymer chain corresponds to general formula (IIIa) wherein Z is a carbon or oxygen atom, wherein n is between 2 and 50, preferably between 3 and 30 and even more preferentially between 5 and 25, and wherein A is a radical corresponding to one of the formulae (A3) and/or (A4) or to a related radical of a HDI trimer which comprises a number of isocyanate functions strictly greater than 1 and less than or equal to 2.2.

According to another embodiment, the polymerizable plasticizer has general formula (II), wherein the hydrocarbon polymer chain corresponds to general formula (IIIa) wherein Z is a carbon or oxygen atom, wherein n is between 2 and 50, preferably between 3 and 30 and even more preferentially between 5 and 25, and wherein A is a radical corresponding to formula (A5) or to a related radical of an IPDI trimer which comprises a number of isocyanate functions strictly greater than 1 and less than or equal to 2.2.

According to a particularly preferred embodiment, the polymerizable plasticizer has general formula (II), wherein the hydrocarbon polymer chain corresponds to general formula (IIIa) wherein Z is a carbon or oxygen atom, wherein n is between 2 and 50, preferably between 3 and 30 and even more preferentially between 5 and 25, and wherein A is a polymer chain (originating from a polymeric MDI) corresponding to formula (A1) which comprises a number of isocyanate functions strictly greater than 1 and less than or equal to 2.2.

According to a particular embodiment, the polymerizable plasticizer has general formula (II), wherein the hydrocarbon polymer chain corresponds to general formula (IIIb) wherein n is between 2 and 50, preferably between 3 and 30 and even more preferentially between 5 and 25.

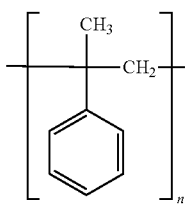

(IIIb)

According to a particular embodiment, the polymerizable plasticizer has general formula (II), wherein the hydrocarbon polymer chain corresponds to general formula (IIIb), wherein n is between 2 and 50, preferably between 3 and 30 and even more preferentially between 5 and 25, and wherein A is a radical corresponding to formula (A2) or to a related radical of a TDI trimer which comprises a number of isocyanate functions strictly greater than 1 and less than or equal to 2.2.

According to another embodiment, the polymerizable plasticizer has general formula (II), wherein the hydrocarbon polymer chain corresponds to general formula (IIIb), wherein n is between 2 and 50, preferably between 3 and 30 and even more preferentially between 5 and 25, and wherein A is a radical corresponding to one of the formulae (A3) and/or (A4) or to a related radical of a HDI trimer which comprises a number of isocyanate functions strictly greater than 1 and less than or equal to 2.2.

According to another embodiment, the polymerizable plasticizer has general formula (II), wherein the hydrocarbon polymer chain corresponds to general formula (IIIb), wherein n is between 2 and 50, preferably between 3 and 30 and even more preferentially between 5 and 25, and wherein A is a radical corresponding to formula (A5) or to a related radical of an IPDI trimer which comprises a number of isocyanate functions strictly greater than 1 and less than or equal to 2.2.

According to a particularly preferred embodiment, the polymerizable plasticizer has general formula (II), wherein the hydrocarbon polymer chain corresponds to general formula (IIIb), wherein n is between 2 and 50, preferably between 3 and 30 and even more preferentially between 5 and 25, and wherein A is a polymer chain (originating from a polymeric MDI) corresponding to formula (A1) which comprises a number of isocyanate functions strictly greater than 1 and less than or equal to 2.2.

Said polymerizable plasticizer used in the composition according to the invention may be obtained by reaction between:
an alcohol type compound containing a hydrocarbon chain comprising and/or being substituted with an aromatic ring and/or an aliphatic ring and/or the hydrocarbon chain of the alcohol type compound being substituted with at least two hydrocarbon chains which may comprise an unsaturation and wherein said alcohol type compound has an —OH number between 0.8% and 2.5%, preferably between 1.3% and 2.4% and even more preferentially between 1.4% and 1.7% by weight relative to the weight of said compound; and
a polyisocyanate comprising 2.1 to 3.2 isocyanate functions and preferably 2.5 to 3.1 isocyanate functions.

In general, the alcohol type compound is a resin bearing only one alcohol function, i.e. a monohydroxylated resin, also known as a monoalcohol, preferably a phenolic monohydroxylated resin, also known as a phenolic monoalcohol.

Examples of monohydroxylated resins that may be used include terpenic resins such as α-pinene, β-pinene, dipentene, D-limonene and turpentine. Examples of phenolic monohydroxylated resins that may be used include those described in Ullmanns Encyklopädie der technischen Chemie, 4th edition, vol. 12, pages 539 to 545 (Verlag Chemie, Weinheim 1976); Kirk-Othmer, Encyclopedia of Chemical Technology, 3rd edition, vol. 12, pages 852 to 869 (John Wiley & Sons, New York, 1980); and Encyclopedia of Polymer Science and Engineering, vol. 7, pages 758 to 782 (John Wiley & Sons, New York, 1987).

Examples of preferred phenolic monoalcohols comprise phenolic α-methylstyrene resins and phenolic coumarone resins.

An example of an alcohol type compound is a phenolic monoalcohol of general formula (IV):

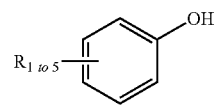

(IV)

wherein $R_{1\ to\ 5}$ are each independently:
halogen,
alkyl,
haloalkyl,
cycloalkyl,
aryl,
alkoxy,
arylalkyl,
heteroaryl,
monounsaturated or polyunsaturated hydrocarbon chain;
and wherein $R_{1\ to\ 5}$ do not contain any hydroxyl functions or any isocyanate functions;
and wherein at least one from among $R_{1\ to\ 5}$ represents a hydrocarbon polymer chain comprising and/or being substituted with at least one repeating unit:
alkyl,
aryl,
arylalkyl,
arylcycloalkyl,
arylheterocycloalkyl,
heteroaryl,
heteroarylalkyl,
heteroarylcycloalkyl,
heteroarylheterocycloalkyl,
hydrocarbyl with at least one unsaturation.

Another example of a phenolic monoalcohol has general formula (V) wherein each R independently represents an arylheterocycloalkyl and/or an arylcycloalkyl comprising 9 to 10 carbons and/or a unit derived from the polymerization of α-methylstyrene.

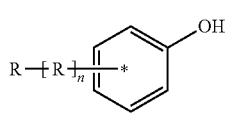

(V)

A particular example of a phenolic resin is a resin of general formula (V) wherein each R independently represents benzofuranyl or indenyl.

A preferred example of a phenolic resin is a resin according to general formula (V) wherein each R represents a unit derived from the polymerization of α-methylstyrene.

A preferred example of a phenolic monoalcohol is a coumarone resin substituted with a phenol at one end, such as Novares® CA 100 resin or Novares® CA 120 resin sold by Rütgers or an α-methylstyrene resin substituted with a phenol at one end, such as Nevoxy EPX-L5 resin sold by Neville, Novares® LA 300 resin (CAS 68512-30-1) sold by Rütgers or Epodil® L resin sold by Air Products or a phenolic aromatic hydrocarbon resin such as Novares® LC 15 resin or Novares® LC 20 resin sold by Rütgers.

According to a preferred embodiment, the phenolic monoalcohol is Novares® LA 300 resin (CAS 68512-30-1).

The polyisocyanate may be an aromatic, aliphatic or cycloaliphatic polyisocyanate.

Said polyisocyanate may be chosen from the group comprising a TDI trimer, a polymeric MDI, a HDI trimer, an IPDI trimer, and mixtures thereof.

An example of an aromatic polyisocyanate that may be used is a polymeric diphenylmethane diisocyanate (MDI) containing 2.7 isocyanate functions, such as Suprasec® 5025 sold by Huntsman.

An example of an aliphatic polyisocyanate that may be used is a HDI trimer containing approximately 3 isocyanate functions, such as Desmodur® N3300 or Desmodur® N100 sold by Bayer.

Masked Polyisocyanate

The masked polyisocyanate that may be introduced in the composition according to the invention makes it possible to bring the free diisocyanate monomers content in the composition according to the invention to a content that complies with and is less than the regulations in force.

This compound is also intended to react with a polyol so as to form a masked prepolymer which may also be introduced in a polyurethane resin composition according to the invention, especially in a stable one-component polyurethane resin composition, so as to bring the free diisocyanate monomers content to a content that complies with and is less than the regulations in force.

The masked polyisocyanate according to the invention also has the advantage of being less reactive than standard polyisocyanates, which makes it possible to improve the stability of the compositions on storage.

What is more, the masked polyisocyanate is a good compatibilizer for the hydrocarbon fillers and the prepolymers present in non-bituminous polyurethane resin compositions and bituminous polyurethane resin compositions, which are preferably stable one-component compositions.

The masked polyisocyanate that may be introduced in the composition according to the invention is a polyisocyanate in which one function has been masked with a monoalcohol, i.e. an adduct of polyisocyanate and of monoalcohol, the two components being linked together via a urethane bond.

This masked polyisocyanate is an alkyl monourethane of polyisocyanate having a number of isocyanate functions between 1.5 and 2.2, preferably between 1.5 and 2.1 and even more preferentially between 1.5 and 2.

Such a masked polyisocyanate is described in patent application PCT/FR2012/052372 filed on 18 Oct. 2012, which is incorporated by reference.

The masked polyisocyanate used in the composition according to the invention has the following formula:

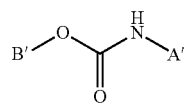

wherein:

B' represents alkyl,

A' represents a group comprising a number of isocyanate functions between 1.5 and 2.2, preferably between 1.5 and 2.1 and even more preferentially between 1.5 and 2.

Preferably, B' is an optionally unsaturated $C_2$-$C_{20}$, preferably $C_3$-$C_{12}$ and even more preferentially $C_4$-$C_{10}$ alkyl.

Preferably, the "group" of A' is:

a polymer chain (originating from a polymeric MDI) corresponding to formula (A'1):

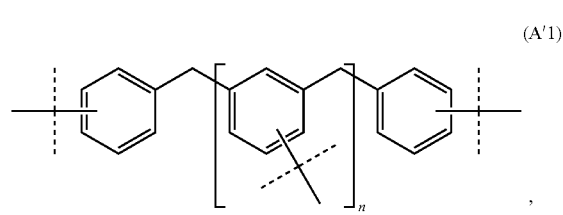

(A'1)

a radical corresponding to formula (A'2) or to a related radical of a TDI trimer:

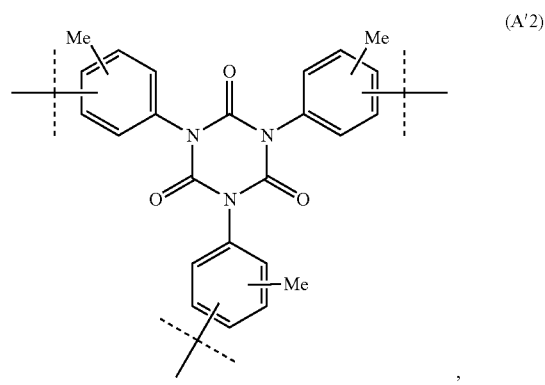

(A'2)

a radical corresponding to one of the formulae (A'3) and/or (A'4) or to a related radical of a HDI trimer:

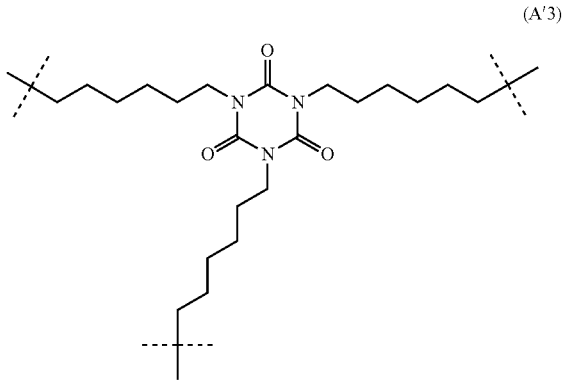

(A'3)

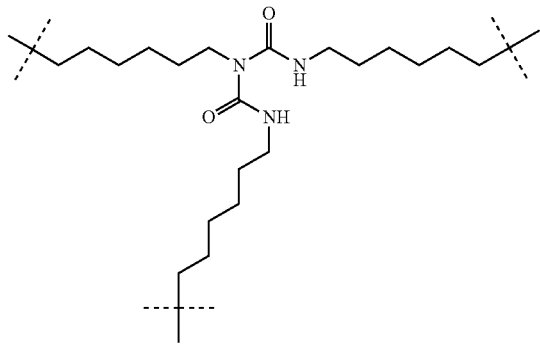

(A'4)

a radical corresponding to formula (A'5) or to a related radical of an IPDI trimer:

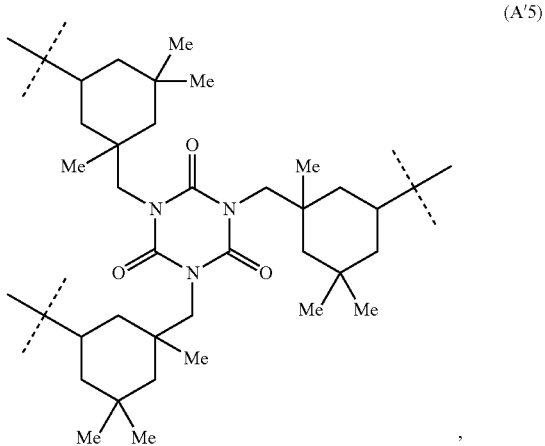

(A'5)

wherein each dashed line represents a point of attachment to a NCO function or to the group —NHCOO—B' of the masked polyisocyanate and on condition that there is at least one dashed line that is a point of attachment to said group —NHCOO—B' and that the remaining lines represent a point of attachment to a NCO function.

The masked polyisocyanate used in the composition according to the invention may be obtained via a process which comprises the gradual addition of a monoalcohol of formula B'—OH to a polyisocyanate of formula A'-NCO, A' and B' being as defined above.

The monoalcohol enabling the masking may be an aliphatic $C_2$-$C_{20}$, preferably $C_3$-$C_{12}$ and even more preferentially $C_4$-$C_{10}$ monoalcohol.

Advantageously, the monoalcohol is chosen from the group comprising hexanol, 2-ethylhexanol, methylhexanol, butanol, terpenols, and mixtures thereof.

The polyisocyanate used to form the masked polyisocyanate is aromatic, aliphatic or cycloaliphatic and comprises between 2.5 and 3.2 NCO functions. It may be chosen from the group comprising a TDI trimer, a polymeric MDI, a HDI trimer, an IPDI trimer, and mixtures thereof.

Preferably, the polyisocyanate used to form the masked polyisocyanate is a polymeric MDI containing between 2.5 and 3.2 NCO functions or a TDI trimer.

More particularly, to form the masked polyisocyanate, an aromatic polyisocyanate that may be used is a polymeric MDI containing 2.7 isocyanate functions, such as Suprasec® 5025 sold by Huntsman or a polymeric MDI containing 2.9 isocyanate functions, such as Suprasec® 2085 sold by Huntsman.

An example of an aliphatic polyisocyanate that may be used to form the masked polyisocyanate is a HDI trimer containing approximately 3 isocyanate functions, such as Desmodur® N3300 or Desmodurc® N100 sold by Bayer.

In order to obtain a number of isocyanate functions between 1.5 and 2.2 on the masked polyisocyanate, 0.60 mol to 1.50 mol and preferably 0.80 mol to 1.30 mol of monoalcohol are added per 1 mol of polyisocyanate. If the monoalcohol content is too low, the number of isocyanate functions will be greater than 2.2, and the mechanical properties, especially the elasticity, of the coating obtained using a composition containing this masked polyisocyanate would be impaired.

The masking of the polyisocyanate predominantly takes place on the most reactive isocyanate function. As a result, the reactivity of the masked polyisocyanate is reduced, which enables the compositions containing it to be more stable over time than compositions containing a nonmasked polyisocyanate. Moreover, the use of the masked polyisocyanate improves the compatibilization between the prepolymers and the bituminous mixtures using natural or synthetic bitumens, especially in stable one-component polyurethane resin compositions.

The reaction between the monoalcohol and the polyisocyanate is an exothermic reaction. The gradual addition of the monoalcohol is thus controlled so as to limit the temperature increase to a value below 60° C., preferably below 50° C. and even more preferentially below 40° C.

When the temperature returns to room temperature (about 20° C.), the reaction is complete.

This process is environmentally friendly, given that it is performed in the absence of any solvent and without heating and that it does not generate any toxic vapors.

It is important to point out that the composition according to the invention comprises the masked polyisocyanate per se, and not reagents for forming the masked polyisocyanate. Thus, the masked polyisocyanate must be presynthesized before being introduced into the composition. Indeed, if a monoalcohol, a polyisocyanate containing between 2 and 3.2 NCO functions and a prepolymer are introduced in a polyurethane resin composition, the prepolymer will react with the monoalcohol, which is not desirable for obtaining an elastic coating since the polymerization will be stopped at the end of the chain because the monoalcohol will have no more reactive functions once it has reacted with the prepolymer. The resulting polymer chains will therefore be shorter, which is detrimental to the elasticity and to the strength of the final coating.

It is also important to point out that the masking of the polyisocyanate is partial masking, i.e. free NCO functions remain to react with OH and/or NCO functions. Partial masking of the polyisocyanate differs from total masking, wherein all the NCO functions of the polyisocyanate are masked. Indeed, the masked polyisocyanate according to the invention can still polymerize with a prepolymer, whereas a fully masked polyisocyanate is not free to polymerize, and a thermal or chemical means needs to be used in order to deblock some of the NCO functions before the composition can polymerize. Total masking of the NCO functions of a polyisocyanate followed by demasking via a thermal or chemical means does not apply to the compositions envisioned herein. Thus, in the compositions according to the invention, there is no need, for example, to heat the composition to high temperature in order to release the masked NCO functions or to add a chemical compound which would make it possible to demask the masked NCO functions to initiate the polymerization.

Masked Prepolymer

The masked prepolymer that may be introduced in the composition according to the invention makes it possible to bring the free diisocyanate monomers content in the composition to a content that complies with and is less than the regulations in force.

The masked prepolymer according to the invention also has the further advantage of being less reactive than standard prepolymers, which makes it possible to improve the stability of the composition on storage.

The masked prepolymer that may be introduced in the composition according to the invention is formed by reaction between:
- a polyol containing between 1.5 and 3 OH functions and having a molecular weight between 900 and 3,000 g/mol, preferably between 1,000 and 2,800 g/mol and more preferentially between 1,500 and 2,500 g/mol; and
- the masked polyisocyanate as described previously containing a number of isocyanate functions between 1.5 and 2.2, in a ratio such that the number of NCO functions of the polyisocyanate relative to the number of OH functions of the polyol is from 1.5 to 2.5 approximately.

The masked prepolymer may also be formed by reaction between said polyol and a mixture of at least one polyisocyanate and of the masked polyisocyanate as defined above.

Said polyol containing between 1.5 and 3 OH functions and having a molecular weight between 900 and 3,000 g/mol introduced in the formulation of the masked prepolymer may especially be a polyether, polyester, polybutadiene or polycarbonate type polyol, and mixtures thereof.

The polyether type polyol may be a polypropylene glycol, a polyethylene glycol, a polypropylene glycol glycerol triol, a polyethylene glycol glycerol triol, or a polytetrahydrofuran.

The polyester type polyol may be a polycaprolactone, a polyester of fatty acid dimers comprising 34 to 36 carbon atoms, a polyadipate polyester or a polyphthalate polyester.

The polycarbonate polyol may be a 1,6-hexanediol polycarbonate.

Preferably, the polyol containing between 1.5 and 3 OH functions and having a molecular weight between 900 and 3,000 g/mol introduced in the formulation of the masked prepolymer is a polytetrahydrofuran, a 1,6-hexanediol polycarbonate, a polyester of fatty acid dimers comprising 34 to 36 carbon atoms, a polycaprolactone or a hydroxylated polybutadiene.

Diluent

The diluent that may be introduced in the composition according to the invention makes it possible to improve the fluidity of the composition while at the same time allowing a good hardening rate. Indeed, the diluent makes it possible to introduce large amounts of bis-oxazolidine in the composition according to the invention.

Bis-oxazolidines are hardeners that are particularly appreciated for accelerating the polymerization of the composition. Indeed, bis-oxazolidines aid in reducing the formation of foam that is inherent in latent open-air polymerization of polyurethane resins. Indeed, during polymerization without this type of hardener, the isocyanate functions of the prepolymers react together in the presence of atmospheric moisture to form urea bonds, releasing carbon dioxide. The released gas leads to the formation of foam which generates surface defects on the final coating. The use of bis-oxazolidine allows another mode of polymerization which does not generate any carbon dioxide. The bis-oxazolidine reacts with the atmospheric moisture, which leads to the opening of the two bis-oxazolidine rings. The open bis-oxazolidine comprises —OH and —NH functions which can react with the isocyanate functions of the prepolymers. Thus, the system polymerizes by formation of urethane and urea bonds without generating carbon dioxide.

Furthermore, certain bis-oxazolidines have the additional advantage of being diluents, which would theoretically make it possible to lower the viscosity of the composition and to improve the compatibilization between the prepolymer and the bitumen. However, this diluent and compatibilizing effect cannot be obtained with the working amounts recommended by the manufacturers since they are too low.

The addition of bis-oxazolidine in amounts higher than the recommended amounts leads to a coating that shows instabilities and that presents risks of under-polymerization. Indeed, the bis-oxazolidines used should not be too reactive or too unreactive to prevent the composition from polymerizing on storage. If too much unreactive bis-oxazolidine is used, some rings of the bis-oxazolidine will not open quickly enough to react with the isocyanate functions of the prepolymers. The rings that have not opened during the open-air polymerization will open once the coating has been formed, under the action of the air moisture, which will generate free —OH and —NH functions in the final coating. This coating will be sensitive to water uptake, which will give rise to swelling and to lifting of the coating and under-polymerization.

The present inventors have found that it is possible to use a large amount of bis-oxazolidine, optionally with a mono-oxazolidine, to lower the viscosity of the composition and avoid the formation of foam during polymerization, without deteriorating the mechanical characteristics of the coating obtained. To do this, they have found that it is necessary to use, together with the bis-oxazolidine, a high dose of catalyst and a polyisocyanate. This diluent enables the amounts of solvent in the composition to be reduced and improves the compatibilization, especially with bitumens.

Furthermore, the introduction of the diluent into a composition according to the invention makes it possible to use prepolymers with a low isocyanate content, i.e. elastomeric prepolymers with a NCO functionality of close to 2 and thus to obtain liquid compositions which give elastomeric coatings. Indeed, a composition with a high isocyanate content is usually needed to dilute a polyurethane resin composition with bis-oxazolidine alone, otherwise the bis-oxazolidine will not polymerize completely, which will give rise to defects in the coating. To obtain a high isocyanate content in the composition, prepolymers with a high isocyanate content such as prepolymers with a functionality of close to 3 may be used. However, trifunctional prepolymers lead to rigid coatings rather than to elastomers, which is not desirable for producing waterproof coatings.

The diluent that may be introduced in the composition according to the invention comprises:
- a polyisocyanate or a mixture of polyisocyanates having a number of isocyanate functions strictly greater than 1 and less than or equal to 3.1, preferably greater than 1.5 and less than or equal to 2.2,
- a bis-oxazolidine and optionally a mono-oxazolidine, and
- a catalyst, the amounts of bis-oxazolidine, and optionally of mono-oxazolidine, and of polyisocyanate or of the mixture of polyisocyanate having a number of isocyanate functions strictly greater than 1 and less than or equal to 3.1 being such that the molar ratio between the —NH functions of the bis-oxazolidine, and optionally of the mono-oxazolidine, and the NCO functions is from 0.3 to 0.75; the —NH functions of the bis-oxazolidine, and optionally of the mono-oxazolidine, being the —NH functions derived from the amine functions formed after opening of the oxazolidine ring.

Preferably, said diluent does not comprise any solvent.

Preferably, said diluent does not comprise any exogenous plasticizer.

Preferably, the diluent that may be introduced in the composition according to the invention consists of:
- a polyisocyanate or a mixture of polyisocyanates having a number of isocyanate functions strictly greater than 1 and less than or equal to 3.1, preferably greater than 1.5 and less than or equal to 2.2,
- a bis-oxazolidine and optionally a mono-oxazolidine, and
- a catalyst, the amounts of bis-oxazolidine, and optionally of mono-oxazolidine, and of polyisocyanate or of the mixture of polyisocyanate having a number of isocyanate functions strictly greater than 1 and less than or equal to 3.1 being such that the molar ratio between the —NH functions of the bis-oxazolidine, and optionally of the mono-oxazolidine, and the NCO functions is from 0.3 to 0.75; the —NH functions of the bis-oxazolidine, and optionally of the mono-oxazolidine, being the —NH functions derived from the amine functions formed after opening of the oxazolidine ring.

The ratio between the bis-oxazolidine, and optionally the mono-oxazolidine, and the polyisocyanate is such that the number of NCO functions of the polyisocyanate is greater than the number of —NH functions of the bis-oxazolidine, and optionally of the mono-oxazolidine (derived from the amine functions released after opening of the bis-oxazolidine ring), such that all the —NH functions can react with the NCO functions of the polyisocyanate.

The amount of mono-oxazolidine in the diluent is between 0 and 40% by weight and preferably between 5% and 25% by weight relative to the weight of the bis-oxazolidine.

The amount of catalyst in the diluent is between 10% and 70% by weight, preferably between 20% and 50% and more preferentially between 30% and 50% by weight relative to the weight of the bis-oxazolidine.

This diluent is described in patent application PCT/FR2012/052376 filed on 18 Oct. 2012, which is incorporated by reference.

According to a particular embodiment, the diluent used in the composition according to the invention comprises:
- an amount of polyisocyanate or of a mixture of polyisocyanates having a number of isocyanate functions strictly greater than 1 and less than or equal to 3.1, such that the number of NCO functions is equivalent to that of 100 parts by weight of diphenylmethane diisocyanate MDI (CAS No. 26447-40-5);
- 40 to 100 parts by weight of bis-oxazolidine and optionally of mono-oxazolidine; and
- 30 to 50 parts by weight of catalyst.

The bis-oxazolidine introduced in the diluent used in the composition according to the invention should not have too high a viscosity so as to have diluent properties. The term "diluent properties" means the capacity of a product to dissolve and/or lower the viscosity of the composition into which it is added. Thus, according to a particular embodiment, said bis-oxazolidine has a viscosity of less than 80 mPa·s at 20° C., preferably of the order of 50 mPa·s at 20° C., measured using a Brookfield viscometer (module 3, rpm).

The bis-oxazolidine is a dioxazolane derivative. Preferably, the bis-oxazolidine comprises a carbonate group between the two oxazolidine rings and corresponds to the following general formula:

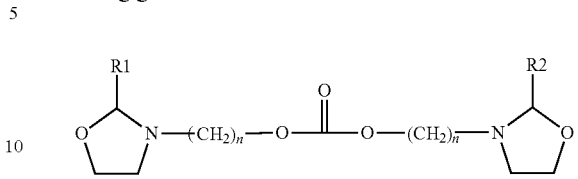

wherein n is an integer equal to 1, 2, 3 or 4; and
wherein R1 and R2 are, independently, a hydrogen or a linear or branched alkyl comprising 1 to 4 carbon atoms.

According to a particular embodiment, the bis-oxazolidine is the product sold by Incorez under the brand name Incozol LV (CAS No. 145899-78-1) having the following general formula:

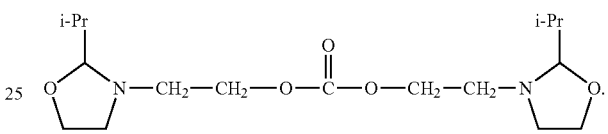

The mono-oxazolidine is a mono-oxazolidine free of OH groups. According to a particular embodiment, the bis-oxazolidine is the product sold by Angus under the brand name Zoldine® ZE (CAS No. 7747-35-5) having the following general formula:

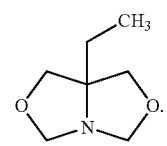

The catalyst used in the diluent is chosen from the group comprising organic acid anhydrides, long-chain fatty acids and organometallic salts, and mixtures thereof. Preferably, the catalyst used in the diluent according to the invention is an organic acid anhydride.

Examples of organic acid anhydrides that may be used include methyltetrahydrophthalic anhydride (MHTPA), methylnadic anhydride (also known as endo-cis-dicyclo(2,2,1)-5-heptene-2,3-dicarboxylic anhydride—CAS No. 129-64-6) and methylsuccinic anhydride.

Examples of long-chain fatty acids that may be used include stearic acid, palmitic acid and oleic acid.

Examples of organometallic salts that may be used include heavy metal salts of fatty acids such as lead, barium, tin or cadmium salts of fatty acids.

According to a particular embodiment, the bis-oxazolidine sold by Incorez under the brand name Incozol® LV is used with MHTPA as catalyst.

By introducing the diluent into a polyurethane resin composition according to the invention not comprising any other catalyst, the amount of catalyst introduced into the resulting polyurethane resin composition is two to ten times higher than the amounts conventionally used in industry. Indeed, the dose of catalyst usually recommended, especially of organic acid anhydride, in a polyurethane resin composition is between 0.02% and 0.5% by weight relative to the weight of the composition. In the context of the invention, the bis-oxazolidine, and optionally the mono-oxazolidine, is activated by adding catalyst in an amount ranging from 0.5% to 5%, preferably from 0.5% to 3.5%, more preferentially from 0.6% to 2.5% and even more preferentially from 1% to 2.2% by weight relative to the weight of the composition.

The polyisocyanate having a number of isocyanate functions strictly greater than 1 and less than or equal to 3.1 used in the diluent is chosen from the group comprising aromatic, aliphatic and cycloaliphatic polyisocyanates, and mixtures thereof.

Said polyisocyanate may be chosen from the group of standard polyisocyanates comprising 2,4-toluene diisocyanate (TDI), a TDI trimer, diphenyl methane diisocyanate (MDI), a polymeric MDI, hexamethylene diisocyanate (HDI), a HDI trimer, isophorone diisocyanate (IPDI), an IPDI trimer, and mixtures thereof.

More particularly, a modified MDI containing 2 isocyanate functions, such as Suprasec® 2385 sold by Huntsman may be used.

An example of an aliphatic polyisocyanate that may be used is HDI containing 2 isocyanate functions, such as Desmodur® N3400 sold by Bayer.

Said polyisocyanate used in the diluent may also be a standard prepolymer resulting from the reaction between a polyol or a mixture of polyols having a number of OH functions between 1.5 and 3 with a polyisocyanate or a mixture of polyisocyanates having a number of NCO functions between 1.6 and 3, in a stoichiometric molecular ratio of from 1.5 to 2.5 approximately of polyisocyanate or of the mixture of polyisocyanates relative to the polyol or mixture of polyols.

Said polyisocyanate used in the diluent may also be a polymerizable plasticizer as described previously.

According to a particular embodiment, said polymerizable plasticizer is the reaction product of a polymeric MDI containing 2.7 NCO functions with a phenolic coumarone resin or a phenolic α-methylstyrene resin.

Said polyisocyanate used in the diluent may also be a polyisocyanate masked with a monoalcohol as described previously.

According to a particular embodiment, said polyisocyanate masked with a monoalcohol is the reaction product of a polymeric MDI with a $C_1$-$C_{20}$ aliphatic monoalcohol, preferably a $C_3$-$C_{12}$ and more preferentially $C_4$-$C_{10}$ aliphatic monoalcohol.

The polyisocyanate used in the diluent may be a mixture of standard polyisocyanate, of masked polyisocyanate, of standard prepolymer, of masked prepolymer and/or of polymerizable plasticizer as described previously.

The diluent according to the invention should preferentially be used rapidly after its preparation so that the polyisocyanate does not react with the bis-oxazolidine. The diluent according to the invention is thus a manufacturing intermediate that is not stable after two days of storage. The diluent according to the invention should be stored protected from air and moisture. On the other hand, when the diluent is added to a polyurethane resin composition, preferably a one-component polyurethane resin composition, the resulting composition is stable and may be stored for a minimum of 4 months without any phase separation or mass gelling being observed. Indeed, the diluent according to the invention will be diluted in the mass of the composition and the polyisocyanate will not react with the bis-oxazolidine as long as the composition is not exposed to atmospheric moisture.

Particular Embodiments of Polyurethane Resin Compositions

According to a particular embodiment, the polyurethane composition according to the invention comprises:
  20% to 50%, preferably from 15% to 45% and even more preferentially from 18% to 40% of a prepolymer;
  20% to 50%, preferably from 25% to 45% and even more preferentially from 30% to 40% of polymerizable plasticizer;
  2% to 25%, preferably from 5% to 20% and even more preferentially from 10% to 15% of diluent;
  0 to 50%, preferably from 10% to 40% and even more preferentially from 20% to 30% of bituminous mixture;
  0 to 10%, preferably from 0 to 5% and even more preferentially from 0 to 2% of solvent;
the percentages being on a weight basis relative to the total weight of the composition.

According to a preferred embodiment, the non-bituminous polyurethane composition according to the invention comprises:
  30% to 50% of prepolymer;
  10% to 50% and preferably 30% to 50% of polymerizable plasticizer, such as the product derived from the reaction between a phenolic α-methylstyrene resin, such as Novares® LA 300 (CAS 68512-30-1) and a polyisocyanate comprising 2 to 3.1 isocyanate functions, such as Suprasec® 5025 (a polymeric MDI containing 2.7 NCO functions);
  5% to 25% and preferably 5% to 15% of diluent, such as the product comprising a bis-oxazolidine, such as Incozol® LV, and optionally a mono-oxazolidine; a catalyst, such as methyltetrahydrophthalic anhydride; and a polyisocyanate or a mixture of polyisocyanates having a number of isocyanate functions strictly greater than 2 and less than or equal to 2.2, such as MDI or a polymeric MDI masked with a monoalcohol;
the percentages being on a weight basis relative to the total weight of the composition.

In these compositions, at least part of the prepolymer may be a masked prepolymer that is the reaction product of a polyol with the masked polyisocyanate having a number of isocyanate functions between 1.5 and 2.2 as described previously.

This composition is liquid, one-component or ready-to-use, stable and free of solvent. It will therefore be entirely suitable for direct, easy application in either exterior or interior use.

According to another preferred embodiment, the bituminous polyurethane composition according to the invention comprises:
  15-15% to 50% of bituminous mixture or cut-back composed of bitumen and of plasticizing oil, such as Ruetasolv® Di;
  20% to 50% of prepolymer;
  10% to 40% of polymerizable plasticizer, such as the product derived from the reaction between a phenolic α-methylstyrene resin, such as Novares® LA 300 (CAS 68512-30-1) and a polyisocyanate comprising 2 to 3.1 isocyanate functions, such as Suprasec® 5025 (a polymeric MDI containing 2.7 NCO functions);
  4% to 10% of diluent, such as the product comprising a bis-oxazolidine, such as Incozol® LV, and optionally a mono-oxazolidine; a catalyst, such as methyltetrahydrophthalic anhydride; and a polyisocyanate or a mixture of polyisocyanates having a number of isocyanate functions strictly greater than 2 and less than or equal to 2.2, such as MDI or a polymeric MDI masked with a monoalcohol.

In this composition, at least part of the prepolymer may be a masked prepolymer that is the reaction product of a polyol with the masked polyisocyanate having a number of isocyanate functions between 1.5 and 2.2 as described previously.

This bituminous composition is liquid, one-component or ready-to-use, stable and free of solvent. It will therefore be entirely suitable for direct, easy application in either exterior or interior use.

Use

The invention also relates to the use of the composition according to the invention for producing a coating, especially a waterproof coating, which has good mechanical strength, is resistant to UV, to oxidation aging, to water and to chemical attack, and which does not have any surface defects or adhesion defects (bubbles, swelling or exudation). Such coatings may be traffic-bearing and are particularly suitable for use in an unprotected exterior medium as waterproof coatings. The obtained coatings have an entirely satisfactory water uptake, i.e. less than 8% after and 28 days of immersion in water at 20° C. The coatings obtained by the use of the composition according to the invention can cover horizontal, oblique, vertical or rough surfaces and/or surfaces comprising singular points.

The non-bituminous polyurethane resin compositions are preferentially used for waterproofing exterior traffic-bearing horizontal surfaces, such as balconies, stadium terraces, car parks, building courtyards, etc.

The bituminous polyurethane resin compositions are preferentially used for making flashings, i.e. for making a waterproof coating between a bituminous surface and a vertical wall or a singular point, or for renovating roofs.

The invention will be described in greater detail with the aid of the following examples, which are given for purely illustrative purposes.

EXAMPLES

In the examples, the parts are expressed on a weight basis. The viscosities are measured using a Brookfield viscometer, spindle 5 or 6, speed 20 rpm at 23° C., less than one week after manufacturing the product or the composition.

In the examples, the following commercial products are used:

Novares® LA 300: phenol-terminated α-methylstyrene resin (CAS 68512-30-1) sold by Rütgers.

Suprasec® 2385: difunctional MDI sold by Huntsman.

Suprasec® 5025: a polymeric MDI containing 2.7 isocyanate functions, sold by Huntsman.

Incozol® LV: bis-oxazolidine sold by Incorez.

Terathane® 2000: polytetrahydrofuran with a molecular weight of 2,000 g/mol sold by Dupont.

Ruetasolv® Di: diisopropylnaphthalene plasticizing aromatic oil sold by Rütgers.

Krasol® LBH-p 3000: polybutadiene diol with a molecular weight of 3,000 g/mol sold by Cray Valley.

Dynasylan®: organosilane adhesion promoter of epoxysilane type sold by Evonik.

PTSI: para-toluenesulfonyl isocyanate.

Desmodur® N3300: HDI trimer containing 3 isocyanate functions sold by Bayer.

PolyTHF® 2000: polytetrahydrofuran containing 2 NCO functions and having a molecular weight of 2,000 g/mol sold by BASF.

Polybutadiene 3000: polybutadiene diol of molar mass 3,000 g/mol.

Voranol® 2000: polypropylene glycol with a molecular weight of 2,000 g/mol (CAS 025322-69-4) sold by Dow Chemical.

Voranol® CP 450: polypropylene glycol glycerol triol (CAS 025791-96-2) with a molecular weight of 450 g/mol sold by Dow Chemical.

Voranate® T80: TDI sold by Dow Chemical.

Terathane® 2000: polytetrahydrofuran with a molecular weight of 2,000 g/mol (CAS 24979-97-3) sold by Dupont.

PCP 1000: polycaprolactone containing 2 OH functions and having a molecular weight of 1,000 g/mol sold by Solvay.

Jeffcat® DMDLS: tertiary amine sold by Huntsman.

Hyperlast® 170/80: PTHF/TDI prepolymer sold by Dow Chemical.

PTSI: para-toluenesulfonyl isocyanate.

Example 1

Preparation of a Polymerizable Plasticizer

The following constituents are mixed in a reactor:
100 parts of Novares® LA 300,
25 parts of Suprasec® 5025.

The mixture is heated for 2 hours.

A polymerizable plasticizer with a Brookfield viscosity (spindle 4, speed 30 rpm) at 23° C. of 1,300 centipoises and a molecular weight of 1,600 g/mol is obtained.

Example 2

Preparation of a Polymerizable Plasticizer

The process is performed as in example 1, the amounts being modified in the following manner:
100 parts of Novares® LA 300,
38 parts of Suprasec® 5025.

A polymerizable plasticizer with a viscosity of about 1,500 centipoises and a molecular weight of 2,200 g/mol is obtained.

Example 3

Preparation of a Polymerizable Plasticizer

The process is performed as in example 1, the amounts being modified in the following manner:
100 parts of Novares® LA 300,
40 parts of Desmodur® N 3300.

A polymerizable plasticizer with a viscosity of about 2,500 centipoises and a molecular weight of 1,400 g/mol is obtained.

Example 4

Preparation of a MDI Masked with Hexanol

The following constituents are mixed in a reactor:
37 parts of Suprasec® 5025,
10.2 parts of hexanol.

The hexanol is gradually added to the MDI so as to keep the temperature of the reaction mixture below 60° C.

A MDI masked with hexanol having a Brookfield viscosity (spindle 4, speed 20 rpm) at 23° C. of 5,000 centipoises is obtained.

Example 5

Preparation of a Masked Polyisocyanate 12 parts of 2-ethylhexanol are gradually added to 37 parts of Suprasec® 5025 in 32.3 parts of Ruetasolv® Di, so that the temperature remains below 50° C.

When the addition of the 2-ethylhexanol is complete, the mixture is allowed to return to room temperature.

A viscosity of 1,000 centipoises is then obtained, as measured with a Brookfield viscometer at 23° C., with a R5 module at a speed of 20 rpm.

Example 6

Preparation of a Masked Polyisocyanate 130 parts of 2-ethylhexanol are gradually added to 37 parts of Suprasec® 5025 in 30 parts of butyl acetate, so that the temperature remains below 50° C.

When the addition of the 2-ethylhexanol is complete, the mixture is allowed to return to room temperature.

A viscosity of 750 centipoises is then obtained, as measured with a Brookfield viscometer at 23° C., with a R5 module at a speed of 20 rpm.

Example 7

Preparation of a Masked Prepolymer

A prepolymer is prepared by reacting 100 parts of Poly-THF® 2000 and 75 parts of the masked polyisocyanate prepared in example 4. The mixture is stirred at 70° C. for 1 hour 15 minutes.

The free diisocyanate monomers content is less than 5%.

Example 8

Preparation of a Masked Prepolymer

A prepolymer is prepared by reacting 3,000 parts of polybutadiene 3000, 135 parts of 1,4-butanediol, 540 parts of Suprasec® 2385 and 800 parts of the masked polyisocyanate prepared in example 6. The mixture is stirred at 70° C. for 1 hour 15 minutes.

The free diisocyanate monomers content is less than 5%.

Example 9

Preparation of a Diluent According to the Invention 100 parts by weight of Suprasec® 2385, 75 parts by weight of Incozol® LV and 50 parts by weight of MHTPA are mixed at room temperature in a mixer.

The diluent obtained has a viscosity of about 150 cPs and makes it possible to improve the fluidity of one-component polyurethane resin compositions containing it, while at the same time allowing a good hardening rate.

Example 10

Preparation of a Liquid Polyurethane Resin Composition (Comparative of Example 11)

The following ingredients are mixed in a reactor so as to form the prepolymer:
200 parts of Voranol® 2000,
24 parts of Voranol® CP 450,
60 parts of Voranate® T80.

The mixture is stirred at 80° C. for 2 hours and, after cooling to about 40° C., the following constituents are added:
24 parts of xylene,
150 parts of Ruetasolv® Di,
200 parts of calcium carbonate as pulverulent filler.

The composition obtained has a Brookfield viscosity (spindle 5, speed 10) at 23° C. of 1,800 centipoises and is applied as an interior coating under tiling. This composition gives off a strong odor of solvent and the coating obtained shows substantial water absorption of about 17% and a lack of adhesion due to the use of plasticizing oil.

Example 11

Liquid Polyurethane Resin Composition

The following ingredients are mixed in a reactor so as to form the prepolymer:
200 parts of Voranol® 2000,
24 parts of Voranol® CP 450,
60 parts of Voranate® T80.

The mixture is stirred at 80° C. for 2 hours and the following constituents are then added:
200 parts of the polymerizable plasticizer prepared according to example 2,
200 parts of pulverulent filler.

A solvent-free liquid one-component composition which has a Brookfield viscosity (spindle 5, speed 10) at 23° C. of 4,500 centipoises is obtained. The composition is applied as an interior coating under tiling. The coating obtained shows water absorption reduced to about 7% and adheres perfectly to the concrete support.

The composition is stored for 4 months at 20° C. After 4 months, the composition rapidly becomes homogeneous when it is mixed with a stick, and no phase separation is observed.

Example 12

Preparation of a Liquid Polyurethane Resin Composition Comprising the Polymerizable Plasticizer The following ingredients are mixed in a reactor so as to form the prepolymer:
24 parts of Terathane® 2000,
6 parts of Suprasec® 2385,
6 parts of the MDI masked with hexanol prepared in example 4,
9 parts of Ruetasolv® Di,
0.084 part of benzoyl chloride.

The reaction mixture is stirred at 400 rpm for 3 hours at 50° C.

The following ingredients are mixed in a dispersion tank so as to form the polyurethane resin composition:
48.3 parts of the prepolymer synthesized above,
38.7 parts of the polymerizable plasticizer synthesized according to example 1,
4.3 parts of gray pigment RAL 7040,
5.9 parts of Incozol® LV,
2.4 parts of methyltetrahydrophthalic anhydride,
0.4 part of benzoyl chloride.

The mixture is stirred at room temperature at a speed of 600 rpm for 6 minutes.

A solvent-free liquid one-component composition which has a Brookfield viscosity (spindle 6, speed 20) at 23° C. of 14,000 centipoises is obtained. The composition is applied directly onto concrete as an interior coating under tiling. The coating obtained shows water absorption reduced to about 7% and adheres perfectly to the concrete support.

The composition is stored for 4 months at 20° C. After 4 months, the composition rapidly becomes homogeneous when it is mixed with a stick, and no phase separation is observed.

Example 13

Liquid Polyurethane Resin Composition

The following ingredients are mixed in a reactor so as to form the prepolymer:

540 parts of Voranate® T80,
90 parts of 1,4-butanediol,
1,000 parts of PCP 1000,
45 parts of Voranol® CP 450,
120 parts of butyl acetate.

The mixture is stirred at 80° C. for 1 hour 30 minutes.

The following ingredients are mixed in a dispersion tank so as to form the polyurethane resin composition:

100 parts of the prepolymer synthesized above,
50 parts of the polymerizable plasticizer synthesized according to example 3,
10 parts of gray pigment RAL 7040,
14 parts of Incozol® LV,
1 part of methyltetrahydrophthalic anhydride.

The mixture is stirred at room temperature at a speed of 600 rpm for 6 minutes.

A liquid one-component composition with a low solvent content (4% solvent) which has a Brookfield viscosity (spindle 6, speed 20) at 23° C. of 6,000 centipoises is obtained. The composition is applied directly onto concrete in exterior use, for example on a balcony. The coating obtained shows water absorption reduced to about 7% and adheres perfectly to certain concrete supports.

Example 14

Primer Composition (Comparative of Example 15)

A prepolymer is prepared by reacting 100 parts of Voranol® 2000 and 54 parts of Suprasec® 2385. The mixture is stirred at 80° C. for 2 hours.

The following primer formulation is then prepared:

154 parts of the preceding prepolymer,
20 parts of Suprasec® 2385,
40 parts of xylene.

The composition may be applied as a primer.

The composition prepared has a Brookfield viscosity (spindle 5) at 23° C. of 400 centipoises.

The composition is stored for 4 months at 20° C. After 4 months, the composition rapidly becomes homogeneous when it is mixed with a stick, and no phase separation is observed.

The free diisocyanate monomers content is greater than 5%. Such a product is labeled "R 40: suspected carcinogenic effect—insufficient proof" in Europe and "hazardous" in Asia.

Example 15

Primer Composition

A prepolymer is prepared by reacting 100 parts of Voranol® 2000 and 91 parts of the masked polyisocyanate prepared in example 4. The mixture is stirred at 80° C. for 2 hours.

A primer solution is prepared by mixing:
154 parts of the preceding prepolymer,
35 parts of the masked polyisocyanate prepared in example 4,
70 parts of xylene.

This one-component composition is stable and may be applied with a roller to make an exterior primer.

The free diisocyanate monomers content is less than 1%. Such a composition may be sold without the labeling "R40: suspected carcinogenic effect—insufficient proof".

Example 16

Bituminous Composition

The cut-back 160/220+PTSI is prepared in a reactor. 80 parts of molten 160/220 grade bitumen are first heated to 110° C., and 20 parts of toluene are incorporated therein. The mixture is stirred at 1,200 rpm for 4 minutes and is allowed to return to room temperature. 1 part of PTSI is then added and the mixture is stirred at 1,200 rpm for 4 minutes.

The following ingredients are mixed in a reactor so as to form the polyurethane resin composition:

100 parts of the masked prepolymer synthesized in example 7,
100 parts of the cut-back 160/220+PTSI synthesized above, and this mixture is stirred for 3 minutes.
15 parts of xylene,
0.2 part of Jeffcat® DMDLS.

The mixture is stirred for 3 minutes. A liquid composition is obtained, which may be used to make a waterproof roof coating. The composition has a free diisocyanate monomers content of less than 1%. Such a composition may be sold without the labeling "R40: suspected carcinogenic effect—insufficient proof".

Example 17

Bituminous Composition

The cut-back 160/220+PTSI is prepared in a reactor. 80 parts of molten 160/220 grade bitumen are first heated to 110° C., and 20 parts of toluene are incorporated therein. The mixture is stirred at 1,200 rpm for 4 minutes and is allowed to return to room temperature. 1 part of PTSI is then added and the mixture is stirred at 1,200 rpm for 4 minutes.

The following ingredients are mixed in a reactor so as to form the polyurethane resin composition:

500 parts of the masked prepolymer synthesized in example 8,
500 parts of the cut-back 160/220+PTSI synthesized above, and this mixture is stirred for 3 minutes.
1 part of Jeffcat® DMDLS.

The mixture is stirred for 3 minutes. A liquid composition is obtained, which may be used to make a waterproof roof coating. The composition has a free diisocyanate monomers content of less than 1%. Such a composition may be sold without the labeling "R40: suspected carcinogenic effect—insufficient proof".

Example 18

Polyurethane Resin Composition (Comparative of Example 19)

100 parts of PolyTHF® 2000, 31 parts of Suprasec® 2385 and 100 parts of Plastisol are placed in a reactor. The mixture is heated at 110° C. for 4 hours with stirring.

The obtained composition is diluted by weight using 20% of a solvent mixture comprising ⅔ of methoxypropyl acetate—⅓ of methyl ethyl ketone.

This one-component polyurethane resin composition may be used for a roof coating. It has a solids content of about 80% and therefore is not compliant with all the national legislations relating to the solvent content.

This composition is thixotropic and has a viscosity of about 20,000 cPs.

Example 19

Polyurethane Resin Composition According to the Invention

The process is performed as in example 18, replacing 15% by weight of the solvent mixture (i.e. ¾ of the solvent) with 15% by weight of the diluent obtained in example 9.

This stable, ready-to-use composition may be used for a roof coating. It has a solids content of about 95% and is therefore compliant with all the national legislations relating to the solvent content.

This composition is thixotropic and has a viscosity of about 20,000 cPs.

Example 20

Polyurethane Resin Composition (Comparative of Example 21)

100 parts of Hyperlast® 170/80, 30 parts of xylene, 0.02 part of dibutyltin dilaurate and 5 parts of pigment are placed in a mixer-disperser.

A liquid composition for producing waterproof interior coatings is obtained.

Example 21

Polyurethane Resin Composition

The process is performed as in example 20, but replacing the 30 parts of xylene with 30 parts of the diluent obtained in example 9.

A solvent-free, stable, liquid, one-component polyurethane resin composition is obtained, which makes it possible to produce defect-free (no bubbling) waterproof coatings with good mechanical characteristics.

The coatings obtained using this composition have an entirely satisfactory water uptake, which is less than 8% after immersion for 28 days in a water bath at 20° C.

Example 22

Polyurethane Resin Composition (Comparative of Example 23)

100 parts of Voranol® 2000, 7 parts of Voranol® CP 450, 35 parts of TDI and 15 parts of xylene are placed in a reactor. The reaction mixture is heated at 80° C. for 2 hours.

0.02 part of dibutyltin dilaurate, 1 part of carbon black and 75 parts of Ruetasolv® Di aromatic oil are then added.

A stable liquid composition for producing waterproof interior coatings is obtained.

Example 23

Polyurethane Resin Composition

The process is performed as in example 22, but replacing the 15 parts of xylene with 15 parts of the diluent obtained in example 9.

A solvent-free, stable, liquid, one-component polyurethane resin composition is obtained, which makes it possible to produce defect-free (no bubbling) waterproof coatings with good mechanical characteristics.

The coatings obtained using this composition have an entirely commercially satisfactory water uptake, which is less than 8% after immersion for 28 days in a water bath at 20° C.

Example 24

Composition for a Base Liquid Waterproof Coating (Comparative of Example 25)

A composition having the following formula is prepared:

| | |
|---|---|
| A. Voranol ® 2000 | 200 parts |
| B. Voranol ® CP 450 | 18 parts |
| C. Butanediol | 9 parts |
| D. TDI | 72 parts |
| E. Dehydrated filler and pulverulent pigments dispersed in a plasticizer, the ratio of which is 2 fillers/1 plasticizer | 27 parts |
| F. Xylene solvent | 19 parts |

A prepolymer is prepared in a reactor by introducing constituents A to D and baking at 80° C. for 1 h30. Next, components E and F are added to this prepolymer, once cold, with stirring. This system is quite slow-hardening, i.e. the hardening time is longer than 24 hours; it is generally not catalyzed since the catalyst would bring about an excessively rapid formation of carbon dioxide and therefore bubbling and foaming, which, for that matter, are never completely avoided.

The composition has a solids content of about 94%, i.e. about 6% solvent.

Example 25

Stable Liquid One-Component Composition for a Waterproof Coating

A diluent according to the invention is prepared, which comprises:
9 parts of Incozol® LV
9 parts of Suprasec® 2385
5 parts of MHTPA.

A prepolymer is prepared as in example 24, component E is added thereto, and 7 parts of xylene and 32 parts of the diluent prepared above are added.

The composition obtained differs from that of example 24 by the following three properties:
- it hardens much more quickly and may thus be subjected to circulation and coverage the day after the application, and occasionally even the same day, which the composition of example 24 does not allow,
- in contrast with the composition of example 24, no bubbling or foaming takes place.
- the solids content of this composition is 98%, i.e. it contains 2% solvent, which not only makes it compliant with the new regulations relating to the solvent content, but also classifies it in USA as a solvent-free product.

Example 26

Ready-to-Use Liquid Polyurethane Resin Composition

The following ingredients are mixed in a reactor so as to form the prepolymer:
- 24 parts of Terathane® 2000,
- 6 parts of Suprasec® 2385,
- 6 parts of the polymeric MDI masked with hexanol, synthesized according to example 4,
- 9 parts of Ruetasolv® Di,
- 0.084 part of benzoyl chloride.

The reaction mixture is stirred at 400 rpm for 3 hours at 50° C.

The following ingredients are mixed in a mixer-disperser so as to form the polyurethane resin composition:
- 48.3 parts of the prepolymer synthesized above,
- 38.7 parts of the plasticizer synthesized according to example 1,
- 4.3 parts of gray pigment concentrate RAL 7040,
- 5.9 parts of Incozol® LV,
- 2.4 parts of methyltetrahydrophthalic anhydride,
- 0.4 part of benzoyl chloride.

A solvent-free liquid composition which has a Brookfield viscosity (spindle 6, speed 20) at 23° C. of 14,000 centipoises is obtained.

The composition is stored for 4 months at 20° C. After 4 months, the composition rapidly becomes homogeneous when it is mixed with a stick, and no phase separation is observed.

Example 27

Preparation of a Liquid Polyurethane Resin Composition

The following ingredients are mixed in a reactor so as to form the prepolymer:
- 24 parts of Terathane® 2000,
- 6 parts of Suprasec® 2385,
- 6 parts of the polymeric MDI masked with hexanol, according to example 4,
- 9 parts of Ruetasolv® Di,
- 0.084 part of benzoyl chloride.

The reaction mixture is stirred at 400 rpm for 3 hours between 70 and 80° C.

The following ingredients are mixed in a reactor so as to form the polyurethane resin composition:
- 11.25 parts of prepolymer synthesized above,
- 9 parts of the polymerizable plasticizer synthesized according to example 1,
- 1 part of gray pigment concentrate RAL 7040,
- 1.372 parts of Incozol® LV,
- 0.562 part of methyltetrahydrophthalic anhydride,
- 0.09 part of benzoyl chloride.

A solvent-free liquid composition which has a Brookfield viscosity (spindle 6, speed 20) at 23° C. of 12,000 centipoises is obtained.

The composition is stored for 4 months at 20° C. After 4 months, the composition rapidly becomes homogeneous when it is mixed with a stick, and no phase separation is observed.

Example 28

Ready-to-Use Liquid Bituminous Polyurethane Resin Composition

The cut-back 70/100+PTSI is prepared in a reactor. 70 parts of molten 70/100 grade bitumen are first heated to 110° C., to which are incorporated 30 parts of heated to 70° C. The mixture is stirred at 1,200 rpm for 4 minutes and is allowed to return to room temperature. 2 part of PTSI are then added and the mixture is stirred at 1,200 rpm for 4 minutes.

The following ingredients are mixed in a reactor so as to form the prepolymer:
- 100 parts of Terathane® 2000,
- 50 parts of Suprasec® 2385,
- 15 parts of Ruetasolv® Di, The reaction mixture is stirred at 400 rpm for 3 hours at 50° C.

The following ingredients are mixed in a mixer-disperser so as to form the polyurethane resin composition:
- 100 parts of the prepolymer synthesized above,
- 30 parts of the plasticizer synthesized according to example 1,
- 100 parts of the cut-back 70/100+PTSI synthesized above,
- 5.9 parts of Incozol® LV,
- 2.4 part of methyltetrahydrophthalic anhydride.

A solvent-free liquid composition which has a Brookfield viscosity (spindle 6, speed 20) at 23° C. of 20,200 centipoises is obtained.

The composition is stored for 4 months at 20° C. After 4 months, the composition rapidly becomes homogeneous when it is mixed with a stick, and no phase separation is observed.

Example 29

Ready-to-Use Liquid Bituminous Polyurethane Resin Composition

The cut-back 160/220+PTSI is prepared in a reactor. 70 parts of molten 160/220 grade bitumen are first heated to 110° C., to which are incorporated 30 parts of heated to 70° C. The mixture is stirred at 1,200 rpm for 4 minutes and is allowed to return to room temperature. 2 part of PTSI are then added and the mixture is stirred at 1,200 rpm for 4 minutes.

The following ingredients are mixed in a reactor so as to form the prepolymer:
- 100 parts of Krasol® LBH-p 3000,
- 19 parts of Suprasec® 2385,
- 30 parts of Ruetasolv® Di,
- 0.24 part of benzoyl chloride.

The reaction mixture is stirred at 400 rpm for 3 hours at 90° C.

The following ingredients are mixed in a reactor so as to form the polyurethane resin composition:
11.25 parts of the prepolymer synthesized above,
5.25 parts of the cut-back 160/220+PTSI synthesized above, and this mixture is stirred for 3 minutes.
The following are then added:
30 parts of the plasticizer synthesized according to example 1,
1.52 parts of Incozol® LV, and this mixture is stirred for 3 minutes. The following are then added:
0.562 part of methyltetrahydrophthalic anhydride,
0.06 part of benzoyl chloride,
0.06 part of dibutyltin dilaurate,
0.2 parts of Dynasylan.
A solvent-free liquid composition which has a Brookfield viscosity (spindle 6, speed 20) at 23° C. of 35,000 centipoises is obtained.
The composition is stored for 4 months at 20° C. After 4 months, the composition rapidly becomes homogeneous when it is mixed with a stick, and no phase separation is observed.

Example 30

Application of the Compositions of Examples 26 to 29

The composition of examples 26, 27, 28 and 29 is applied using a fabric roller to a 25 m² flat cement surface.
The coating obtained is uniform and bubble-free, and no exudation is observed. The surface of the coating is smooth and shiny.
Tests performed: Tensile strength and elastic elongation on an Instron machine according to standard EN ISO 527-3.
Composition of Example 26:
The composition is applied as a 0.9 mm layer. The coating obtained has the following properties:
tensile strength 2.5 MPa,
elastic elongation 600% (without extensometer).
Composition of Example 27:
The composition is applied as a 0.9 mm layer. The coating obtained has the following properties:
tensile strength 2.5 MPa,
elastic elongation 600% (without extensometer).
Composition of Example 28:
The composition is applied as a 1.3 mm layer. The coating obtained has the following properties:
tensile strength 4.2 MPa,
elastic elongation 400% (without extensometer).
Composition of example 29:
The composition is applied as a 1 mm layer. The coating obtained has the following properties:
tensile strength 2 MPa,
elastic elongation 400% (without extensometer).

The invention claimed is:
1. A polyurethane resin composition comprising a prepolymer and a polymerizable plasticizer containing a hydrocarbon chain, only one end of which bears more than one isocyanate function, said hydrocarbon chain comprising and/or being substituted with an aromatic ring and/or an aliphatic ring and/or said hydrocarbon chain being substituted with at least two hydrocarbon chains that may comprise an unsaturation, and the number of isocyanate functions being strictly greater than 1 and less than or equal to 2.2, wherein said polymerizable plasticizer has a molecular weight between 800 and 3,000 g/mol.

2. The polyurethane resin composition according to claim 1, further comprising at least one constituent chosen from the group consisting of:
a masked polyisocyanate, which has the following formula:

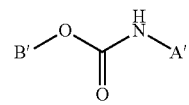

wherein
B' represents alkyl,
A' represents a group comprising a number of isocyanate functions between 1.5 and 2.2;
a diluent comprising:
a polyisocyanate or a mixture of polyisocyanates having a number of isocyanate functions strictly greater than 1 and less than or equal to 3.1,
a bis-oxazolidine and optionally a mono-oxazolidine, and
a catalyst,
the amounts of bis-oxazolidine, and optionally of mono-oxazolidine, and of polyisocyanate or of the mixture of polyisocyanate containing a number of isocyanate functions strictly greater than 1 and less than or equal to 3.1 being such that the molar ratio between the —NH functions of the bis-oxazolidine, and optionally of the mono-oxazolidine, and the NCO functions is from 0.3 to 0.75;
the —NH functions of the bis-oxazolidine, and optionally of the mono-oxazolidine, being the —NH functions derived from the amine functions formed after opening of the oxazolidine ring;
and mixtures thereof.

3. The polyurethane resin composition according to claim 1, wherein said composition comprises bitumen or a bituminous mixture.

4. The polyurethane resin composition according to claim 2, wherein said composition comprises a prepolymer, the polymerizable plasticizer and the diluent.

5. The polyurethane resin composition according to claim 2, wherein said composition comprises a prepolymer, the polymerizable plasticizer, the masked polyisocyanate and the diluent.

6. The polyurethane resin composition according to claim 1, wherein said composition is liquid and does not contain any solvent.

7. The polyurethane resin composition according to claim 1, wherein said composition has a viscosity between 1,000 and 40,000 centipoises, said viscosity being measured at 25° C. using a Brookfield DV-E viscometer, spindle 6, speed 20 rpm.

8. The polyurethane resin composition according to claim 2, wherein said composition contains less than 1% by weight of free diisocyanate monomers, as measured by gas chromatography coupled with mass spectrometry.

9. The polyurethane resin composition according to claim 1, wherein the polymerizable plasticizer has a viscosity between 400 and 14,000 centipoises, measured with a Brookfield viscometer (spindle 6, speed 20 rpm, 25° C.).

10. The polyurethane resin composition according to claim 2, wherein the group B' of the masked polyisocyanate is a $C_2$-$C_{20}$ alkyl.

11. The polyurethane resin composition according to claim 2, wherein the diluent comprises:

an amount of polyisocyanate or of a mixture of polyisocyanates containing a number of isocyanate functions strictly greater than 1 and less than or equal to 3.1, such that the number of NCO functions is equivalent to that of 100 parts by weight of diphenylmethane diisocyanate MDI (CAS No. 26447-40-5);

40 to 100 parts by weight of bis-oxazolidine and optionally of mono-oxazolidine; and 30 to 50 parts by weight of catalyst.

12. The composition according to claim 1, wherein at least part of the prepolymer is a masked prepolymer which is formed by reaction between:

a polyol containing between 1.5 and 3 OH functions and having a molecular weight between 900 and 3,000 g/mol; and a masked polyisocyanate which has the following formula:

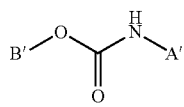

wherein

B' represents alkyl,

A' represents a group comprising a number of isocyanate functions between 1.5 and 2.2, in a ratio such that the number of NCO functions of the polyisocyanate relative to the number of OH functions of the polyol is from 1.5 to 2.5 approximately.

13. The composition according to claim 2, comprising:
30% to 50% of prepolymer,
30% to 50% of polymerizable plasticizer,
5% to 15% of diluent comprising a bis-oxazolidine and optionally a mono-oxazolidine, a catalyst and a polyisocyanate or a mixture of polyisocyanates having a number of isocyanate functions strictly greater than 1 and less than or equal to 2.2.

14. The composition according to claim 3, comprising:
15% to 50% of bituminous mixture;
20% to 50% of prepolymer;
10% to 40% of polymerizable plasticizer;
4% to 10% of diluent comprising a bis-oxazolidine and optionally a mono-oxazolidine, a catalyst and a polyisocyanate or a mixture of polyisocyanates having a number of isocyanate functions strictly greater than 1 and less than or equal to 2.2.

15. A method for the preparation of a coating which is optionally trafficable, which has good mechanical strength, which is resistant to UV, to oxidation aging, to water and to chemical attack, which has no surface defects or adhesion defects, which is suitable for use in an unprotected exterior medium and which has a water uptake of less than 8% after 28 days of immersion in water at 20° C. comprising applying the composition according to claim 1 on a surface.

* * * * *